US012699199B2

(12) United States Patent
Fu et al.

(10) Patent No.: US 12,699,199 B2
(45) Date of Patent: Aug. 4, 2026

(54) SEPARATION OF SEISMIC SOURCES BY JOINT INTERPOLATION AND DEBLENDING

(71) Applicant: BP Corporation North America Inc., Houston, TX (US)

(72) Inventors: Kang Fu, Katy, TX (US); Joseph Anthony Dellinger, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 515 days.

(21) Appl. No.: 17/936,449

(22) Filed: Sep. 29, 2022

(65) Prior Publication Data
US 2023/0129626 A1     Apr. 27, 2023

Related U.S. Application Data

(60) Provisional application No. 63/271,300, filed on Oct. 25, 2021.

(51) Int. Cl.
G01V 1/34          (2006.01)
G01V 1/30          (2006.01)
G01V 1/38          (2006.01)

(52) U.S. Cl.
CPC ................ G01V 1/345 (2013.01); G01V 1/30 (2013.01); G01V 1/3843 (2013.01); G01V 2210/74 (2013.01)

(58) Field of Classification Search
CPC ........ G01V 1/345; G01V 1/30; G01V 1/3843; G01V 2210/74; G01V 1/366; G01V 1/005; G01V 2210/127
See application file for complete search history.

(56) References Cited

U.S. PATENT DOCUMENTS

| | | | |
|---|---|---|---|
| 8,295,124 B2 | 10/2012 | Abma | |
| 10,768,327 B2 * | 9/2020 | Haacke | .................. G01V 1/36 |

(Continued)

FOREIGN PATENT DOCUMENTS

| | | |
|---|---|---|
| EP | 3339910 A1 | 6/2018 |
| EP | 3063567 B1 | 7/2022 |

(Continued)

OTHER PUBLICATIONS

Wang et al. Efficient Deblending in the PFK Domain Based on Compressive Sensing, IEEE Transactions on Geoscience and Remote Sensing, vol. 58, No. 2, Feb. 2020 (Year: 2020).*

(Continued)

*Primary Examiner* — Alesa Allgood
*Assistant Examiner* — Dilara Sultana
(74) *Attorney, Agent, or Firm* — Conley Rose, P.C.

(57)          ABSTRACT

Generally, seismic data may provide valuable information with regard to the description such as the location and/or change of hydrocarbon deposits within a subsurface region of the Earth. The present disclosure generally discusses techniques that may be used by a computing system to analyze a data set including weak-coherence signals (e.g., non-coherent blending noise). In particular, a computing system may detect portion of the weak-coherence signals of a gather due to the overlap of selected seismic source excitations and use a mask to isolate coherent signals and the other weak-coherence signals from the masked portion of weak-coherence signals. The coherent signals and other weak-coherence signals may be iteratively processed and used to predict values of the masked weak-coherence signals.

24 Claims, 11 Drawing Sheets

(56)                References Cited

U.S. PATENT DOCUMENTS

| | | | | |
|---|---|---|---|---|
| 2015/0241587 A1* | 8/2015 | Baardman | ............. | G01V 1/364 |
| | | | | 702/17 |
| 2017/0068011 A1* | 3/2017 | C | ............................ | G01V 1/30 |
| 2020/0073001 A1* | 3/2020 | Bekara | ................... | G01V 1/364 |
| 2020/0116885 A1 | 4/2020 | Abma et al. | | |
| 2020/0225377 A1 | 7/2020 | Li et al. | | |
| 2021/0157021 A1 | 5/2021 | Fu | | |

FOREIGN PATENT DOCUMENTS

| | | | | | |
|---|---|---|---|---|---|
| WO | 2008/025986 A1 | 3/2008 | | | |
| WO | 2010/019957 A1 | 8/2009 | | | |
| WO | 2015/063595 A1 | 5/2015 | | | |
| WO | WO-2019099974 A1 * | 5/2019 | ............. | G01V 1/282 | |
| WO | 2021/055152 A1 | 3/2021 | | | |

OTHER PUBLICATIONS

PCT/US2022/077225 International Search Report and Written Opinion dated Jan. 3, 2023 (16 p.).

Fu, Kang, "Recovering Signals Misallocated During Deblending: Toward a More Robust Inversion Loop," Society of Exploration Geophysicists, SEG Technical Program Expanded Abstracts, SEG International Exposition and 90th Annual Meeting, Sep. 30, 2020, pp. 61-65 (6 p.).

To, R.T. et al., "Model-Based Deblending Workflow and Its Application to Multiple Source Acquisition Data," 79th EAGE Conference & Exhibition 2017, Paris, France, Jun. 12-15, 2017 (5 p.).

Singapore Application No. 11202402443S Search Report and Written Opinion dated Mar. 26, 2026 (10 p.).

European Office Action dated Apr. 13, 2026, for European Application No. 22797216.3 (7 p.).

* cited by examiner

280

ACCESS ALL TRACES IN
SELECTED SHOTS ASSOCIATED
WITH THE SELECTED RECEIVER — 284

FOURIER TRANSFORM TRACES IN
THE TIME AND SPACE DIRECTIONS — 286

ATTENUATE NOISE / ENHANCE
COHERENT ENERGY IN
TRANSFORMED RECEIVER GATHER — 288

INVERSE FOURIER TRANSFORM — 290

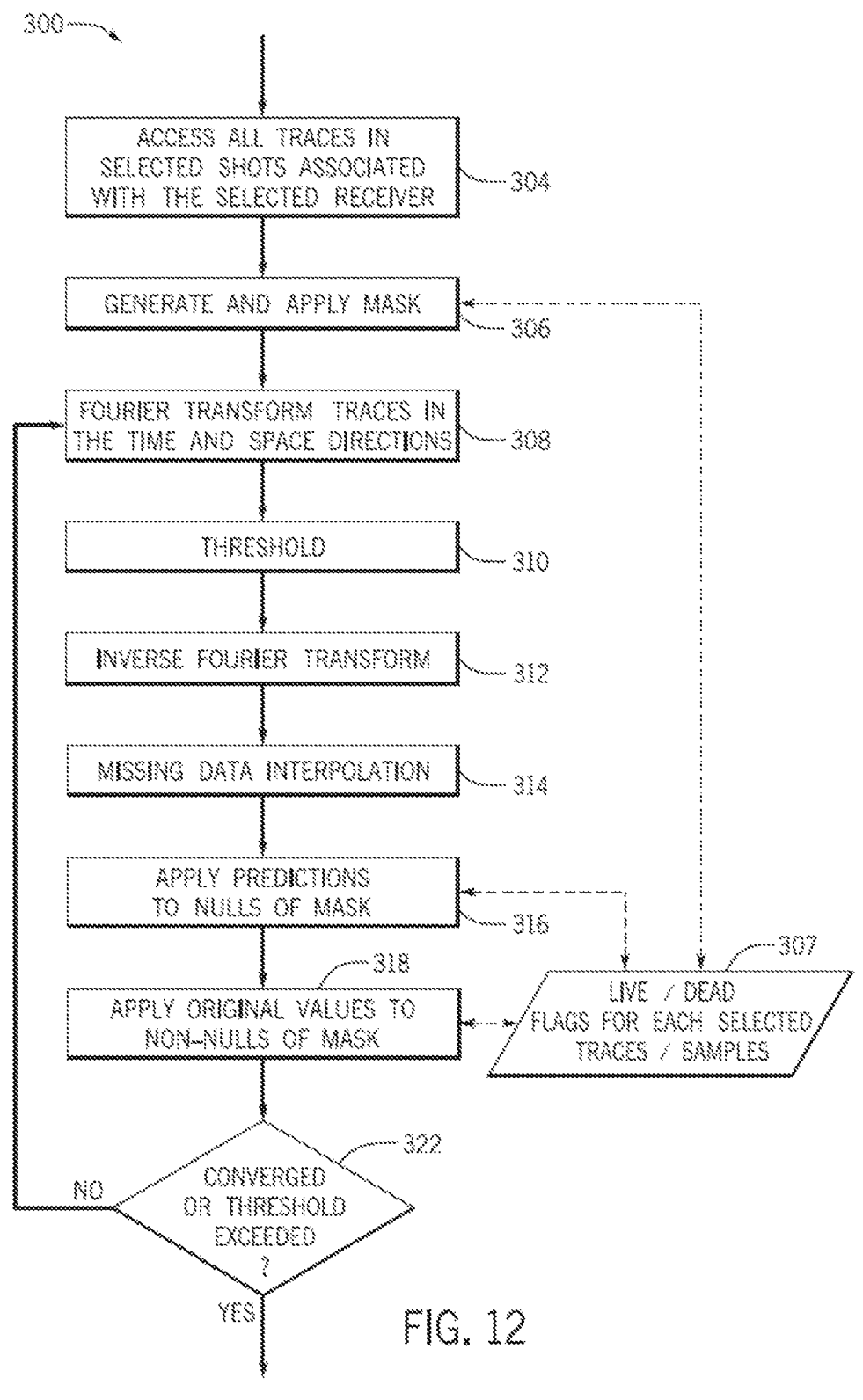

300

ACCESS ALL TRACES IN
SELECTED SHOTS ASSOCIATED
WITH THE SELECTED RECEIVER — 304

GENERATE AND APPLY MASK — 306

FOURIER TRANSFORM TRACES IN
THE TIME AND SPACE DIRECTIONS — 308

THRESHOLD — 310

INVERSE FOURIER TRANSFORM — 312

MISSING DATA INTERPOLATION — 314

APPLY PREDICTIONS
TO NULLS OF MASK — 316

318
APPLY ORIGINAL VALUES TO
NON-NULLS OF MASK

307
LIVE / DEAD
FLAGS FOR EACH SELECTED
TRACES / SAMPLES

322
CONVERGED
OR THRESHOLD
EXCEEDED
?

NO

YES

SEPARATION OF SEISMIC SOURCES BY JOINT INTERPOLATION AND DEBLENDING

CROSS-REFERENCE TO RELATED APPLICATIONS

This application claims benefit of U.S. Provisional patent application No. 63/271,300 filed on Oct. 25, 2021 and entitled "Separation of Seismic Sources by Joint Interpolation and Deblending," the disclosure of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to seismic image generation, and more specifically, to signal recovery techniques to be used as part of existing deblending operations and separation operations to improve amounts of coherent signals recovered during simultaneous source acquisition.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., acoustic wave) signal that travels downward through the Earth, is reflected, and, upon its return, is recorded using one or more receivers disposed on or above the subsurface region of the Earth. The seismic data recorded by the receivers may be used to create an image or profile of the corresponding subsurface region.

Over time, as hydrocarbons are being extracted from the subsurface region of the Earth, the location, saturation, and other characteristics of the hydrocarbon reservoir within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced using seismic waveforms produced by a source, reflected off regions within a subsurface, and received by one or more receivers. The seismic image may be constructed using a high resolution seismic velocity model, such as full waveform inversion (FWI) model, a tomography model, or the like applied, for example, via a velocity model builder. The seismic velocity model may include data indicative of a change in velocity of the seismic waveforms during propagation through the subsurface region. The source that produces the seismic waveforms may be an active source (e.g., anthropogenic sources of seismic waves such as explosives or airguns), or a passive source (e.g., non-anthropogenic such as waves or wind). Certain techniques employ active sources due to the resulting high signal-to-noise ratio (SNR) of the seismic waveforms. Passive sources may complement active source seismic surveys. For example, passive sources may assist in the generation of velocity models of a near surface region (e.g., less than approximately 500 meters (m) below the surface of the Earth and/or a seafloor).

In addition to the examples provided above, image and/or data registration techniques may be used for various applications in seismic data processing, as described herein. For example, the systems and methods described below may be used for signal recovery associated with returned signals received during simultaneous source data acquisition. To elaborate, sometimes simultaneous sources are used to gather data to generate a seismic image. Simultaneous sources may provide many benefits in the generation of a seismic image, such as improved efficiency, improved resulting seismic images, and reduced cost, relative to non-simultaneous sources. However simultaneous sources sometimes lead to particular challenges too, such as signal interferences which lead to data having weak-coherence (e.g., not coherent, non-coherent, lacking complete energy coherence).

In non-simultaneous source acquisition, seismic sources may be shot with suitably long time intervals to cause many or all desired seismic signals generated from previous shot to be recorded before the next shot is fired. However, in simultaneous source acquisition, the time intervals may be smaller than the time used to record a complete shot. Thus, seismic signals generated from neighboring shots may blend together, resulting in weak-coherence signals.

Acquiring seismic data with shots where the recorded information from one shot overlaps in time with other shots may reduce (e.g., significantly reduce) time and/or cost of performing (e.g., shooting) a seismic survey. This approach may permit more closely spaced shot point intervals (e.g., during a marine survey) that may provide better seismic images and/or improve the chances of discovering economic quantities of oil, gas, and/or other resources. Simultaneously using multiple types of sources may permit for broader-bandwidth data to be acquired with the same efficiency as conventional air-gun data.

The blending noise may refer to signals received during data collection periods that interfere with a current data collection period and may be read as noise (e.g., weak-coherence energy or signal) despite being part of a primary signal (e.g., coherent energy or signal) for a subsequent input data (e.g., input seismic data) collection period. Deblending (used interchangeably herein with "deblending operation" or "deblending operations") refers to the techniques used to separate the signals such that signals generated by each shot are placed into the right data collection periods. In this way, the blending noise may refer to signals misplaced that are to be recovered and associated with their corresponding primary signals (e.g., corresponding coherent energy in a subsequent data collection period). In addition, in the case of multiple source activation, deblending may also refer to a reclassification of at least a portion of overlapping signals (e.g., a portion corresponding to one source but not another source) to return the at least a portion of overlapping signals to a data set corresponding to its actual source. However, when the seismic acquisition is less than ideal, weak-coherency signals may be contaminated by strong blending noise during deblending operations. It may be desired to develop and/or improve techniques associated with coherent energy (e.g., coherent signal) recovery to suitably gather and associate the blending noise with its corresponding primary signals.

BRIEF DESCRIPTION OF THE DRAWINGS

Various aspects of this disclosure may be better understood upon reading the following detailed description and upon reference to the drawings in which:

FIG. 12 illustrates another example process for extracting coherent signals from a noisy gather to be used in accordance with the process of FIG. 10 based at least in part on a projection onto convex sets (POCS) interpolation, in accordance with embodiments presented herein.

DETAILED DESCRIPTION OF SPECIFIC EMBODIMENTS

Figure 1:
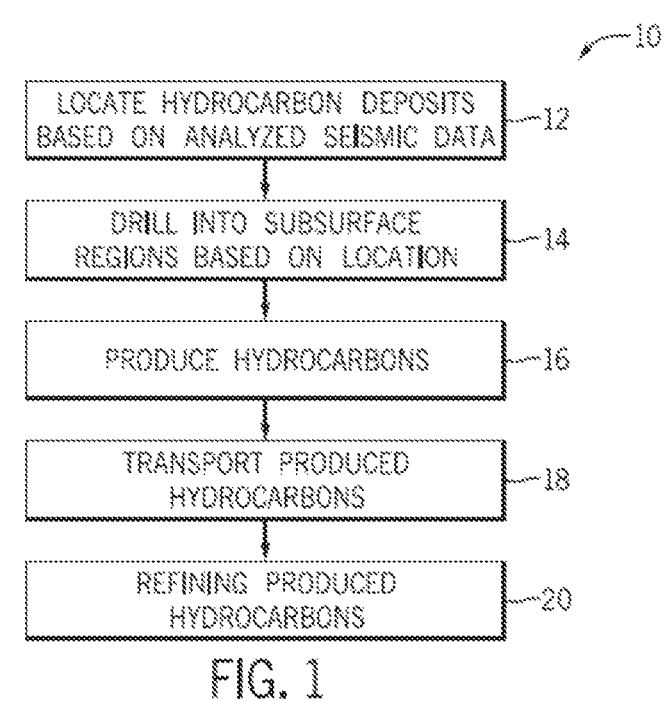
FIG. 1 illustrates a flow chart of various processes that may be performed based on analysis of seismic data acquired via a seismic survey system, in accordance with embodiments presented herein.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Analysis of seismic data may provide valuable information, such as the location and/or change of hydrocarbon deposits within a subsurface region of the Earth. The present disclosure generally discusses techniques that may be used by a computing system to analyze a data set that includes weak-coherence (e.g., non-coherent) signals gathered from, for example, a seismic survey. Improvements to the processing of the seismic data and subsequent image generation may be made by improving signal recovery techniques used to associate received signals to source-specific gathers (e.g., data sets based at least in part on the source which generated the seismic signal). In particular, a computing system may detect weak-coherence signals of a gather and use a mask to isolate signals from the weak-coherence signals generated by certain sources (e.g., a different source type). The isolated signals may be processed and used to predict the values of the coherent signals where the weak-coherence signals are masked-out and the actual weak-coherence signals (or noise) after subtracting by the predicted coherent signals. In this way, the computing device may generate an improved data set (e.g., the data set having complete data without weak-coherence signals) by implementing the predicted values as the weak-coherence signals in the data set, and another coherent data set (e.g., a different source type) by shifting the weak-coherence signals (or noise) after subtraction to associate to its own source activation times. Sometimes data sets generated from seismic surveys are organized, or analyzed, into one or more gathers. Each gather (e.g., data set) may correspond to signals received from a particular source. Weak-coherence signals may correspond to signal overlap between two sources (e.g., two interfering sources). In this way, handling the data sets to eliminate overlap between the seismic signals received may improve deblending operations to sort signals received since the signals received are better able to be separated into respective gathers (e.g., respective gathers corresponding to different sources used in a seismic survey). Furthermore, since the computing device may perform various operations on the improved data set based at least in part on the predicted values used to replace the weak-coherence signals in the data set, computing system operations performed on the improved data set may improve relative to operations performed on data sets that did not use coherent signals to predict values for weak-coherence signals.

Figure 2:
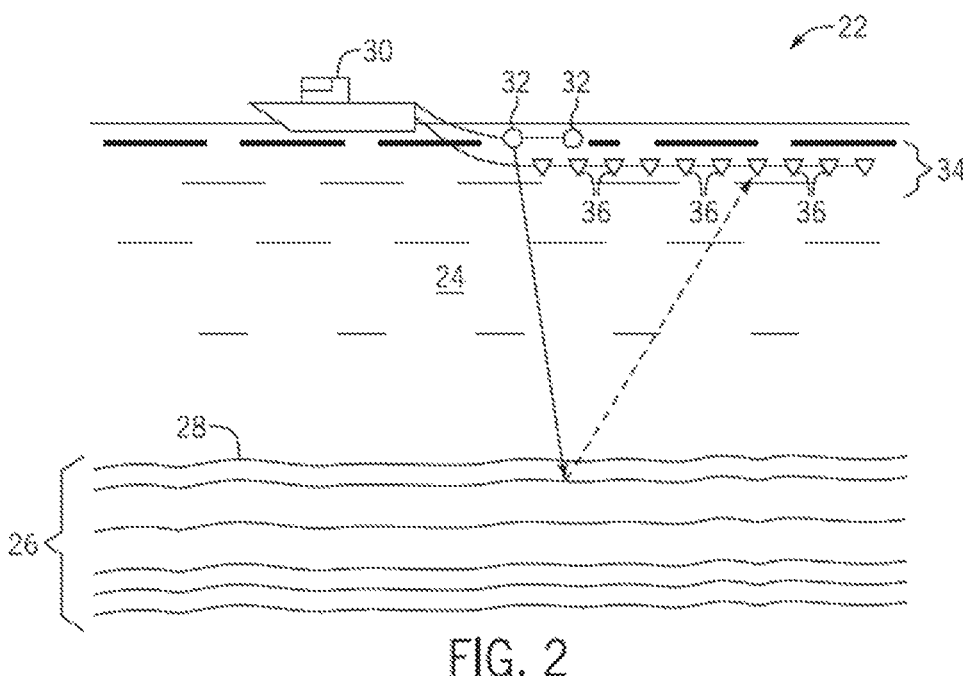
FIG. 2 illustrates a marine survey system in a marine environment, in accordance with embodiments presented herein.
Figure 3:
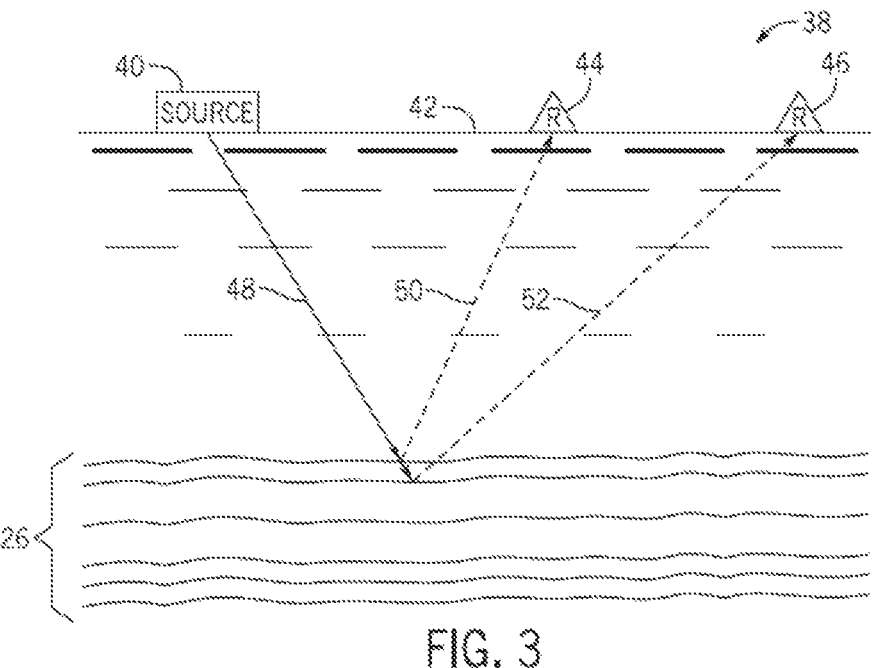
FIG. 3 illustrates a land survey system in a land environment, in accordance with embodiments presented herein.

By way of introduction, seismic data may be acquired using a variety of seismic survey systems and techniques, two of which are discussed with respect to FIG. 2 and FIG. 3. Regardless of the gathering technique utilized, after the seismic data is acquired, a computing system may analyze the acquired seismic data and use results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like, via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an airgun array) that may produce energy, such as acoustic waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

Figure 2A:
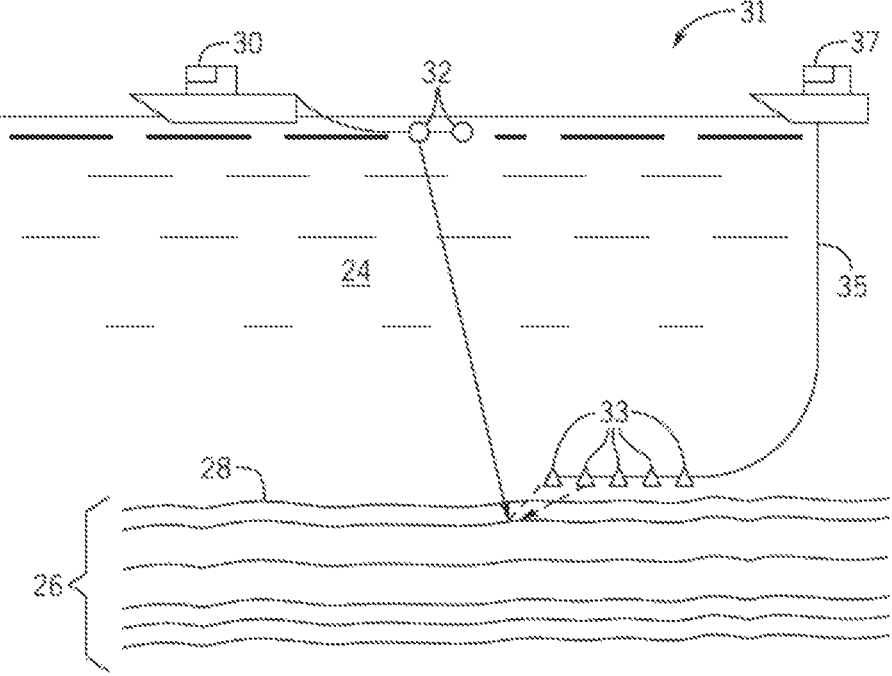
FIG. 2A illustrates a second marine survey system in a marine environment, in accordance with embodiments presented herein.

FIG. 2A illustrates an Ocean Bottom Seismic (OBS) system 31 as a second marine survey system (e.g., for use in conjunction with block 12 of FIG. 1) that also may be employed to acquire seismic data (e.g., waveforms) regarding a subsurface region of the Earth in a marine environment. The OBS system 31 may operate to generate seismic data (e.g., OBS datasets). While the illustrated OBS system 31 is an Ocean Bottom Cable (OBC) system inclusive of one or more receivers 33 disposed on the seafloor 28 coupled via a cable 35 to a second vessel 37, other embodiments of an OBS system 31, such as an Ocean Bottom Node (OBN) system or any other seismic system that produces higher signal-to-noise images at differing frequencies compared to those of the marine survey system 22 may be utilized.

As illustrated, the OBS system 31 may include a seismic source 32 (e.g., an airgun array) that is towed by a vessel 30 and which may produce energy, such as sound waves (e.g., seismic waveforms), that is directed at the seafloor 28. This energy may be reflected off of various geological formations within the subsurface region 26 and subsequently acquired (e.g., received and/or recorded) by the one or more receivers 33 disposed on the seafloor 28. For example, data may be stored in the one or more receivers 33 for an extended period of time (e.g., hours, days, weeks, or longer) prior to the stored data being retried (either via cable 35 or wirelessly). As illustrated, the one or more receivers 33 may be coupled to a vessel 37 (and, in some embodiments, to one another) via the cable 35. Data acquired via the one or more receivers 33 may be transmitted via the cable 35 to the vessel 37 (or, for example, wirelessly if the OBS system 31 is an OBN system).

In some embodiments, the OBS system 32 may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3DHR datasets. Therefore, the OBS dataset is complementary with respect to bandwidth a 3DHR dataset acquired via the marine survey system 22 (e.g., acquired via a 2D high-resolution seismic acquisition, a 3D high-resolution seismic acquisition, or the like).

Other non-marine seismic systems used to gather seismic data are additionally envisioned for use with the present techniques. For example, FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., acoustic waves, seismic waveforms) directed at the subsurface region 26 of the Earth. Upon reaching various geological formations (e.g., salt domes, faults, folds) within the subsurface region 26, the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
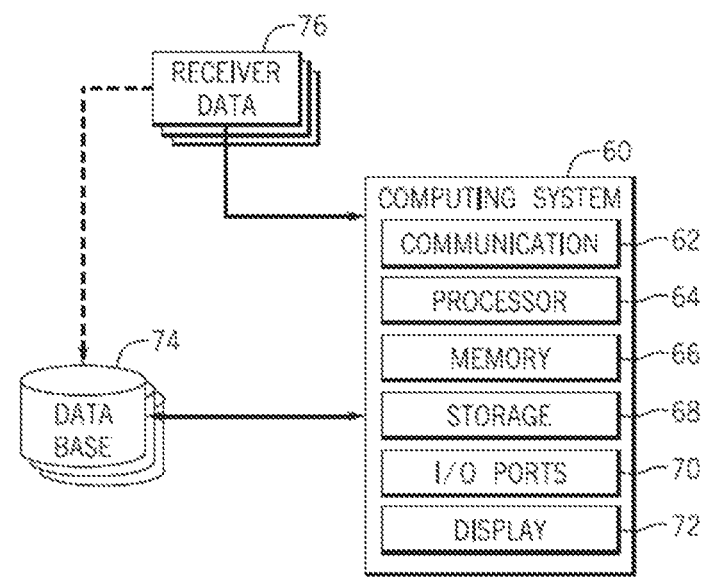
FIG. 4 illustrates a computing system that may perform operations described herein based on data acquired via the marine survey system of FIG. 2 and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22, the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the receivers 36, 44, 46, or the like. Further, it may be noted that the listed components are provided as example components, and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that may extend for some distance. In a two-dimensional (2-D) seismic survey, the receiver locations may be placed along a single line, whereas, in a three-dimensional (3-D) survey, the receiver locations may be distributed across the surface in a grid pattern. As such, a 2-D seismic survey may provide a cross sectional picture (vertical slice) of Earth layers present directly beneath the recording locations. A 3-D seismic survey, on the other hand, may create a data "cube" or volume that may correspond to a 3-D picture of the subsurface region 26.

In addition, a four-dimensional (4-D) or time-lapse seismic survey may include seismic data acquired during a 3-D survey at multiple times. Using the different seismic images acquired at different times, the computing system 60 may compare the two images to identify changes in the subsurface region 26.

In any case, a seismic survey may include a large number of individual seismic recordings (e.g., seismic traces, traces). As such, the computing system 60 may analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
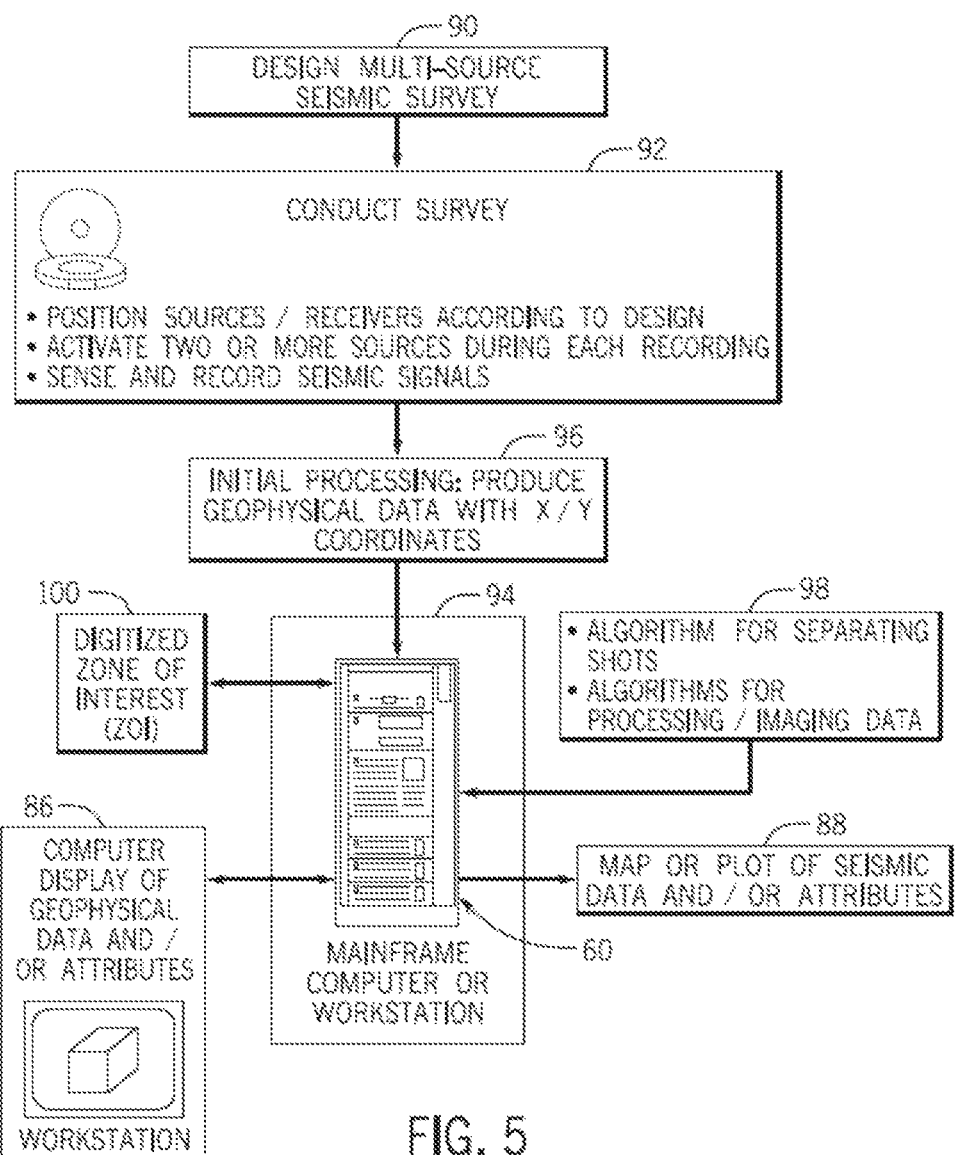
FIG. 5 illustrates the computing system of FIG. 4 receiving a survey design and analyzing data gathered according to the survey design, in accordance with embodiments presented herein.

In some embodiments, a seismic image may be generated in conjunction with a seismic processing scheme such as, for example, a computer display of geophysical data and/or attributes (block 86) or a map and/or plot of seismic data and/or attributes (block 88), such as a paper or printed map and/or plot, as illustrated in FIG. 5, by the computing system 60 (and more specifically, the processor 64 operating in conjunction with at least one of the memory 66 or the storage 68). FIG. 5 illustrates an example system that may use the techniques described herein. A seismic survey may be designed by an explorationist, or operator, (block 90) to cover a region of economic interest. Field acquisition parameters (e.g., shot spacing, line spacing, fold, source type, etc.) are typically selected during the design of the seismic survey, although it is common to modify ideal design parameters during actual execution of the seismic survey (e.g., in the field) to accommodate realities of conducting the survey.

Seismic data (e.g., seismic traces) may be collected during the execution of the seismic survey (block 92). The seismic data may be collected over a subsurface region (e.g., target) of economic interest and are typically sent thereafter to a processing center (block 94), where the traces are made more suitable for use in exploration. In some cases, there may be some amount of initial data processing performed while the data are still in the field and/or by the processing center (block 96). The initial data processing operations may facilitate preparing the seismic traces for analysis and/or use by the operator, and may involve retrieving and/or storing at least part of the seismic data into a memory. For example, on a storage device such as a hard disk, magnetic tape, solid state drive, magneto-optical disk, DVD disk, cloud storage, or other suitable storage technique. As described above, during the execution of the seismic survey there may be two more overlapping simultaneous sources of a same type, and/or there may be two or more overlapping simultaneous sources of different types. As described above, the recordings of different sources may have been combined in a single volume.

The computing system 60 may implement the described methods based at least in part on a software application storing instructions as depicted in block 98. The software application may be installed into the memory 66 and executable by the processor 64 (e.g., one or more processors) of the computing system 60 to execute algorithms for separating shots and/or for processing/imaging of the seismic data. Although not specifically depicted, the computing system 60 may include mainframes, servers, workstations, super computers, a network of computers supporting parallel computations (e.g., where a computational load may be distributed between two or more processors of the network of computers), or the like.

As is also illustrated in FIG. 5, in some embodiments, the computing system 60 may implement the described methods based at least in part on a digitized zone of interest (ZOI) model (e.g., represented via block 100). The ZOI model may be specified by the user and provided as input to the processing computer program. In the case of a 3-D seismic section, the ZOI model may include specifics as to the lateral extent and thickness (which might be variable and/or measured in time, depth, frequency, or the like) of a subsurface target. It is noted that the zones may be created, picked, digitized, stored, and later read during program execution using any suitable system and/or method.

Software applications (e.g., represented via the blocks 86, 88, 98, 100) may be conveyed into the computing system 60 via, for example, a floppy disk, a magnetic disk, a magnetic tape, a magneto-optical disk, an optical disk, a compact disc read-only memory (CD-ROM), a digital versatile disk (or digital video disk) (DVD), a random-access memory (RAM) card, flash random-access memory (RAM), a read-only memory (ROM) card, a programmable read-only memory (PROM) chip, or loaded over a network (e.g., a wired or wireless network, etc.). After processing, resulting traces may be sorted into gathers. The gathers may be stacked and/or displayed either via the display 72 (e.g., represented via the block 86) and/or as a printed seismic section or a map resulting from printing operations (e.g., represented via the block 88). The seismic interpreter may use the displayed images to assist in identification of subsurface features conducive to the generation, migration, and/or accumulation of hydrocarbons.

Figure 6:
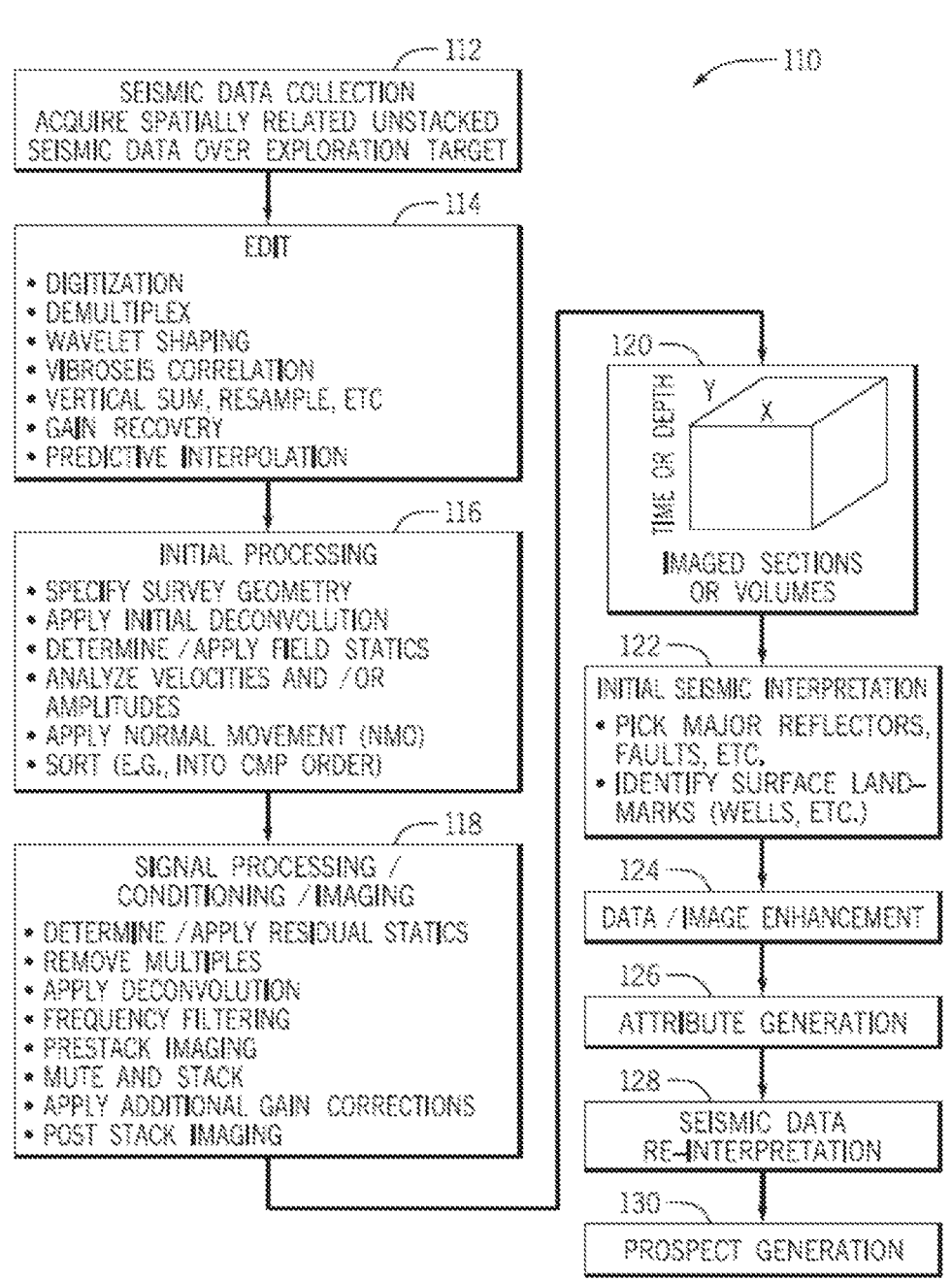
FIG. 6 illustrates a seismic processing sequence used by the computing system of FIG. 4 to receive data acquired and analyze the data acquired, in accordance with embodiments presented herein.

The above-described systems and methods may be used when performing seismic processing described in FIG. 6. FIG. 6 illustrates a method 110 for generating prospects and preparing seismic data for interpretation. Those of ordinary skill in the art may recognize that the processing steps illustrated in FIG. 6 broadly represent the processes that may be applied to seismic data and/or broadly represent the choice and/or an order of the processes. Any suitable techniques may be used and may vary from the depicted processes based at least in part on the individual seismic processor, signal source (e.g., dynamite, vibrator, airgun, low-frequency generator), survey location (e.g., land, sea) of the data, a company that processes the data, or the like. For ease of discussion, the computing system 60 is described as performing the method 110 below to prepare and analyze seismic data for prospect generation.

At block 112, the computing system 60 may conduct a seismic survey (e.g., 2-D, 3-D, 4-D, or the like) over a particular volume of the subsurface of the Earth. The data collected may include unstacked (e.g., unsummed) seismic traces. The unstacked seismic traces may include digital information representative of a volume of the Earth lying beneath the survey. The computing system 60 may use any suitable data collection technique. Note that for ease of description, the seismic survey performed at block 112 is a blended source survey where reflections from a later source activation may interfere with (or coincide in time with) reflections from an earlier one (e.g., a first activation of the source 40 interferences with a second and later activation of the source 40). After the shots or sources have been separated according to techniques described herein, the resulting unstacked seismic traces may be useable for additional seismic analysis. Thus, present systems and methods may permit multiple seismic traces to be obtained from sources 40 that produce overlapping signals based on the activation pattern of the sources 40. It is noted that the resulting separated seismic data sets are equivalent to or substantially equivalent to seismic data sets obtained using fully separated source activations and seismic data acquisitions (e.g., non-overlapping sources and unstacked seismic traces).

The purpose of a seismic survey is to acquire a collection of spatially-related seismic traces over a subsurface target of economic interest. Data suitable for analysis by systems and methods disclosed herein may include an unstacked 2-D seismic line, an unstacked 2-D seismic line extracted from a 3-D seismic survey, an unstacked 3-D portion of a 3-D seismic survey, or the like. For ease of discussion, traces included within a 3-D survey (stacked or unstacked as the discussion warrants) are discussed herein, however it should be appreciated that any assembled group of spatially related seismic traces may be used.

At block 114, the computing system 60 may edit (e.g., preparatory processing, initial processing) the acquired seismic data. Thus, the computing system 60 may edit the acquired seismic data in preparation for subsequent processing (e.g., digitization operations, demulitplexing operations, vertical summing, resampling, gain recovery, wavelet shaping, bad trace removal, predictive interpolation per methods described in FIG. 12, or the like).

At block 116, the computing system 60 may perform additional processing (e.g., initial processing) to the acquired seismic data after editing operations of the block 114. The additional processing may include specification of the geometry of the survey and/or storing of a shot/receiver (e.g., receiver 44, 46) number and a surface location as part of each seismic trace header. Once the geometry has been specified, a velocity analysis may be performed and/or a normal move out (NMO) correction may be applied to correct each trace in time, thereby accounting for signal arrival time delays caused by offset. In some embodiments, computing system 60 may reference the editing operations from the block 114 during the processing operations of the block 116, such as in conjunction with or in place of the wavelet shaping/Vibroseis® correlation steps.

After completion of initial pre-stack processing (e.g., blocks 114, 116), the computing system 60 may, at block 118, process, condition, and/or image the seismic signal on the unstacked seismic traces before creating stacked (e.g., summed) data volumes. The computing system 60 may generate a stacked seismic volume or, in the case of 2-D data, a stacked seismic line for use in the exploration for hydrocarbons within the subsurface of the Earth (e.g., represented within block 120). Any digital sample within a stacked seismic volume may be uniquely identified by one or more parameters or data fields. For example, a unique seismic volume may be identified via a (X, Y, TIME) triplet, where X and Y coordinates may represent some position on the surface of the Earth and the time coordinate may indicate a recorded arrival time within the seismic trace. For ease of discussion, as referred to herein the X direction corresponds to the "in-line" direction, and the Y direction corresponds to the "cross-line" direction, as the terms "in-line" and "cross-line" are generally understood in the art. Although time is a preferred vertical axis unit, those skilled in the art understand that other units may be used as the vertical axis units, for example, depth or frequency. Conversion of seismic traces from one axis unit (e.g., time) to another (e.g., depth) may be possible via mathematical conversion techniques.

At block 122, the computing system 60 may perform an initial seismic interpretation of the resulting stacked volume (e.g., represented within block 120), where principal reflectors and/or faults are located and identified wherever occurring in the stacked seismic volume (e.g., data set). The computing system 60 may perform, at block 124, additional data enhancement operation on the stacked seismic data and/or may perform, at block 126, an attribute generation operation on the stacked seismic data. In some cases, the computing system 60 may, at block 128, revisit or reinterpret an original interpretation of the stack seismic data in light of the additional information obtained from the data enhancement and/or attribute generation operations.

At block 130, the computing system 60 may combine information gleaned from the seismic data with other data to generate prospects, such as magnetic surveys, gravity surveys, Landsat program data, regional geological studies, well logs, well cores, or the like. The prospects may be used to locate subsurface structural or stratigraphic features conducive to the generation, accumulation, and/or migration of hydrocarbons, or the like.

Figure 7:
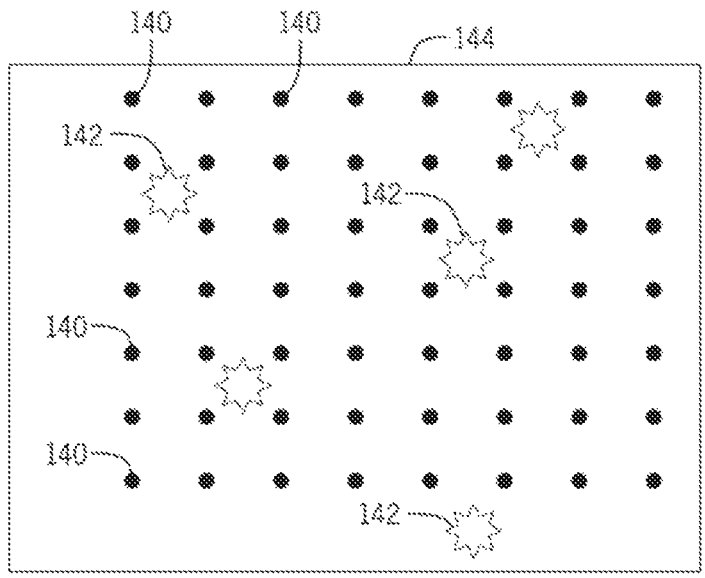
FIG. 7 illustrates a plan view schematic of an example blended source survey, in accordance with embodiments presented herein.
Figure 8:
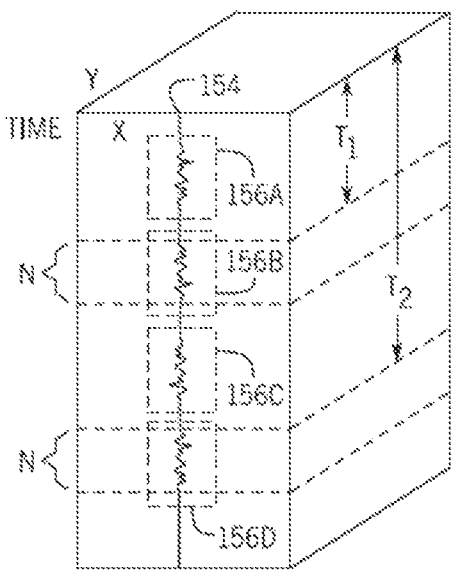
FIG. 8 illustrates schematically how different shots may be identified and extracted within the blended source survey, in accordance with embodiments presented herein.

Turning to the systems and methods disclosed herein, a method may include separating two or more seismic sources that have been activated during a single recording session. A similarity between nearby shots may be used to constrain the inversion process and create at least two separated seismic data sets. FIG. 7 and FIG. 8 depict an exemplary seismic survey and an example trace. A blended source survey may be collected by first laying out a number of receivers 140 in a 2-D configuration over a target (e.g., desired exploration site). It is noted that any number of any suitable receiver 140 may be used in the seismic survey, such as the receivers 36, 44, 46 described above. The receivers 140 might be connected by cables and/or via a wireless coupling to a central recording unit (e.g., the computing system 60) to store the seismic signals received and/or each receiver 140 might use some amount of internal data storage to store data associated with the seismic signals received.

In some embodiments, the receivers 140 may record the data associated with the seismic signals for a period of time. For example, the receivers 140 may record for a few hours, one-half day, a full day, multiple days, or the like. These recordings may capture two or more source excitations. This may be in contrast to typical seismic surveys where the receivers 140 record for a relatively short time period, for example a few seconds, after the activation of a source 142. While the receivers 140 record, a number of seismic sources 142 may be activated at different locations within a survey area 144. In some embodiments, two or more seismic sources 142 are used, where each seismic source 142 may use a different (e.g., not equal) source signature and/or frequency range.

The two or more seismic sources 142 may include any number of discrete and/or continuous sources. In a marine context, the seismic sources 142 may include one or more airguns, sparkers, vibrators, or the like. In some embodiments, any number, volume, and/or type of seismic sources 142 may be included in an array. As an example, an array may include one or more large volume airguns, one or more medium volume airguns, and/or one or more small volume airguns. The seismic sources 142 may be arranged in various arrays. For example, the array may position a collection of seismic sources proximate to each other and be intended to activate as part of a same seismic shot. It is noted that sources 142 may be of a marine context and/or of a land context (or on land). In this way, any number of any suitable sources 142 may be used in the seismic survey, such as the source 32 (e.g., marine context) and/or the source 40 (e.g., land context) described above.

In a marine context, the array positioning the collection of seismic source may include a single seismic array of sources 142 or multiple source arrays each including sources 142 towed by one or more boats. A subarray (which might include one or more sources 142) will be understood to be a subset of the sources 142, with the sources 142 assigned to each subarray may be activated simultaneously.

On land, the two or more sources 142 may include vibrators, charges, humming seismic sources, or the like. For example, the two or more sources 142 may include land vibrators (e.g., about 10, 8-12), Mini-Sosie™ surveys, weight drop surveys, or the like. One type of seismic surveying system uses a vibrator or group of vibrators to provide the source 142 of the acoustic energy (hereinafter referred to as "Vibroseis source"). A Vibroseis source 142 may generate ("vibrate") the acoustic energy waves at predetermined vibrator points (VPs). The VPs may be physically marked with a stake placed before initiation of the survey. Additionally or alternatively, global positioning satellite (GPS) equipment may be used to locate predetermined VPs.

Other sources may include low-frequency sources 142 such as those used in marine surveys, including Wolfspar® sources. The low-frequency sources 142 may each operate at a single frequency (e.g., monochromatic low-frequency sources), cycle between two or more discrete frequencies (e.g., stepped-frequency low-frequency sources), and/or sweep over a narrowband range of low frequencies designed to augment the frequency range produced by the broadband sources (e.g., narrowband low-frequency sources). The sources 142 may operate to produce acoustic waves having constant (e.g., substantially similar) amplitudes, or the amplitude of the waves may vary (e.g., taper up and down). In this context, "low-frequency" refers to frequencies less than about 6-8 Hertz (Hz). Some embodiments may use frequencies below about 4 Hz (e.g., 2 Hz, 1.5 Hz, 0.5 Hz, or the like).

In some embodiments, the two or more seismic sources 142 may use different signatures. In Vibroseis operations, the vibrator(s) of the Vibroseis source 142 may generate a vibration pattern that changes frequency over a predetermined period of time. This vibration pattern may be referred to as a vibratory sweep. A typical Vibroseis sweep may be a linear frequency sweep from approximately 5 Hz to 100 Hz and may have a duration of the order of 5 to 30 seconds. Airguns may generate high-frequency acoustic waves. The low-frequency sources 142 may generate low-frequency signals over a longer time period, and in some embodiments, the low-frequency sources 142 may operate continuously.

In some embodiments, random time periods may separate activations of the sources 142. Further, the sources 142 may be activated in time such that at least a portion of the shots overlap or blend. A threshold parameter may be used to define a suitable amount of overlap or blending between the sources 142. When the seismic records are corrected for each zero time (e.g., activation time) of the source 142, the reflections related to that source 142 tend to be coherent (e.g., described herein as coherent signals). However, sometimes the reflections also include weak-coherence or incoherent signals. For example, the energy from interfering sources may be of weak coherence or generally incoherent (e.g., reflections do not line up, non-coherent signals) since delay between shots is random. That is, for example, in the case of a survey where each source 142 is a Vibroseis unit, the activations of the source 142 may be separated by a few seconds. Note that FIG. 7 is not intended to suggest that each source 142 is activated simultaneously but instead to indicate that each source is located at a different location within the survey area 144. During some surveys, ten or more different sources 142 might be used. An example exploration method that may produce data suitable for use with the techniques described herein is discussed in Patent Cooperation Treaty Patent Application No. WO 2008/025986 (PCT/GB2007/003280) "Seismic Survey Method" which names Howe as its sole inventor and is incorporated herein by reference in its entirety. Howe discusses the use of staggered activation of vibrator activations wherein there is some overlap in the returning subsurface reflections.

While the seismic sources 142 may include discrete or semi-discrete signatures, one or more of the seismic sources 142 may continuously operate based at least in part on a continuous firing pattern and/or as a continuous emission source. In some embodiments, "continuous firing pattern" may refer to continuous shooting, and also may be referred to as "continuous patterned shooting" and/or "continuous firing patterns." Specifically, instead of shooting one firing pattern and then shooting a different firing pattern, there may be no time delay between activation of the seismic sources 142 and a continuous firing pattern may be used (e.g., continuous popcorn-type firing pattern in the case of airgun arrays). As such, in some embodiments, there may be gaps of a few seconds to several seconds between two firing patterns. Low-frequency sources 142 may operate continuously over a given time period to produce the low-frequency energy in a continuous manner.

As described above, different types of sources 142 may have different characteristics. The different sources 142 may use different signatures and/or different frequency ranges based at least in part on differences in the source signatures, relevant coherency criteria, and/or acquisitions processes (e.g., 2-D acquisition, 3-D acquisition, and so on) to provide improved separation in the acquired data. Example source 142 combinations may include using air-guns with vibrators, air-guns with sparkers, air-guns with a low-frequency source (e.g., a Wolfspar source, etc.), and/or combinations of three or more source types, or the like.

FIG. 8 illustrates, in a general way, what the data from a blended source survey might look like. Each receiver 140 may generate a seismic trace (e.g., trace 154) that may be tens of minutes or several hours (e.g., days, or any suitable length of time) in length. In FIG. 8, the trace 154 is shown schematically as including recorded signals from four different source excitations (corresponding to portions 156A, 156B, 156C, 156D). While the illustrated signals are shown as being similar, the recorded signals may have signatures matching the source 142. When multiple sources 142 having different source signatures are used, the signals may have correspondingly different signatures. Associated with each receiver 140 is a location on the surface of the Earth. When the signals that have been recorded via each receiver 140 are suitably arranged and displayed, in some embodiments, a 3-D volume may be generated with each receiver 140 being associated with an "X" and a "Y" location to provide locations based on latitude and longitude.

During a blended source survey, the computing system 60 may record the time at which each source 142 is activated and, in particular, determine the sources 142 located inside the receiver field (e.g., reception field of a respective receiver 140). The locational determination may be made relative to other sources 142 and indicate which are located in the receiver field while indicating which are located outside the receiver field.

Turning to FIG. 8, a first time (e.g., $T_1$) and a second time (e.g., $T_2$) represent the known times (measured from an arbitrary zero time) at which two sources 142 were activated, with the parameter "N" indicating in a general way the length of time (and/or a number of samples) after the source 142 activation during which reflections from the subsurface from this source 142 might be sensed. In this particular example, and as explained in greater detail below, the two source activations may originate from the same source 142 (e.g., two Vibroseis sweeps) and be timed in such a way to not cause signal overlapping in time. However, with other embodiments, the source activations may originate from different sources 142. In this arrangement, other seismic sources 142 activated during the time window indicated (e.g., window indicated by "N") or that had subsurface reflections arriving during this same time interval may cause signal interference. Keeping the forgoing in mind, operations described herein may be applied when the two or more source activations overlap in time regardless of when the overlap in time.

Separation of seismic data sets may generate seismic data for use in various subsequent processing operations. In some embodiments, the resulting separated seismic data sets may include different seismic trace data. It should be appreciated that an inversion process described herein may permit some elements of the separated seismic data sets to be respectively interpolated to predict data for use in an iterative application of the inversion process. This may enable at least a portion of the resulting separated seismic data sets to be predicted based on existing data of the data sets, which may produce more complete (e.g., improved) separated data sets. In some embodiments, the seismic survey may be designed to purposefully avoid certain shot points (e.g., randomly picked or regularly picked shot points from pre-designed survey plot). In these cases, interpolation described above may be permitted to fill in the shot points with value predictions. Avoiding certain shot points may increase the incoherency of blending noise and result in improved separation (e.g., better separation, easier separation) of seismic data sets.

In some embodiments, one or more of the separated seismic data sets may be used for full-waveform inversion (FWI) analysis. FWI is a time-based or frequency-based seismic processing technique that may provide a generalized imaging subsurface structures. For example, instead of relying exclusively on reflected or scattered waves echoing off of geological discontinuities in the Earth, FWI also uses transmitted/refracted waves that travel downwards, turn to become horizontal, and finally turn upwards to emerge as up-going seismic waves, such as at a considerable distance from the originating source 142. Subsurface structures in the Earth advance, retard, and/or distort these transmitted and refracted diving waves by their presence. FWI may correct for distorted diving waves based on location and/or properties from characteristic imprints the diving waves leave in the data. Note that FWI may be inaccurate and may not resolve the subsurface structures (thus, produce an insufficient or otherwise undesirable result) without low-frequency wide-offset data which includes the transmitted/refracted waves. Some seismic sources 142 may not provide the low-frequency waves are generally desired and/or produce the low-frequency data used when performing FWI. Thus, the separation and generation of the separated seismic data sets may generate low-frequency data for use in FWI and/or other seismic data processing operations.

The separated seismic data sets may be analyzed and/or processed based at least in part on separate processing techniques applied to data from differing sources 142. Systems and methods used to separate coherent data from interfering events may be selected based at least in part acquisition geometry (e.g., survey design), capabilities of the sources 142 (e.g., design, specifications, operating tendencies, or the like), choice of smoothing method, or the like. In one embodiment, initiation times of the source 142 may be periodic and/or carefully chosen such that arriving signals generated by one source 142 may be easily separated from arriving signals generated by other sources 142.

Figure 9:
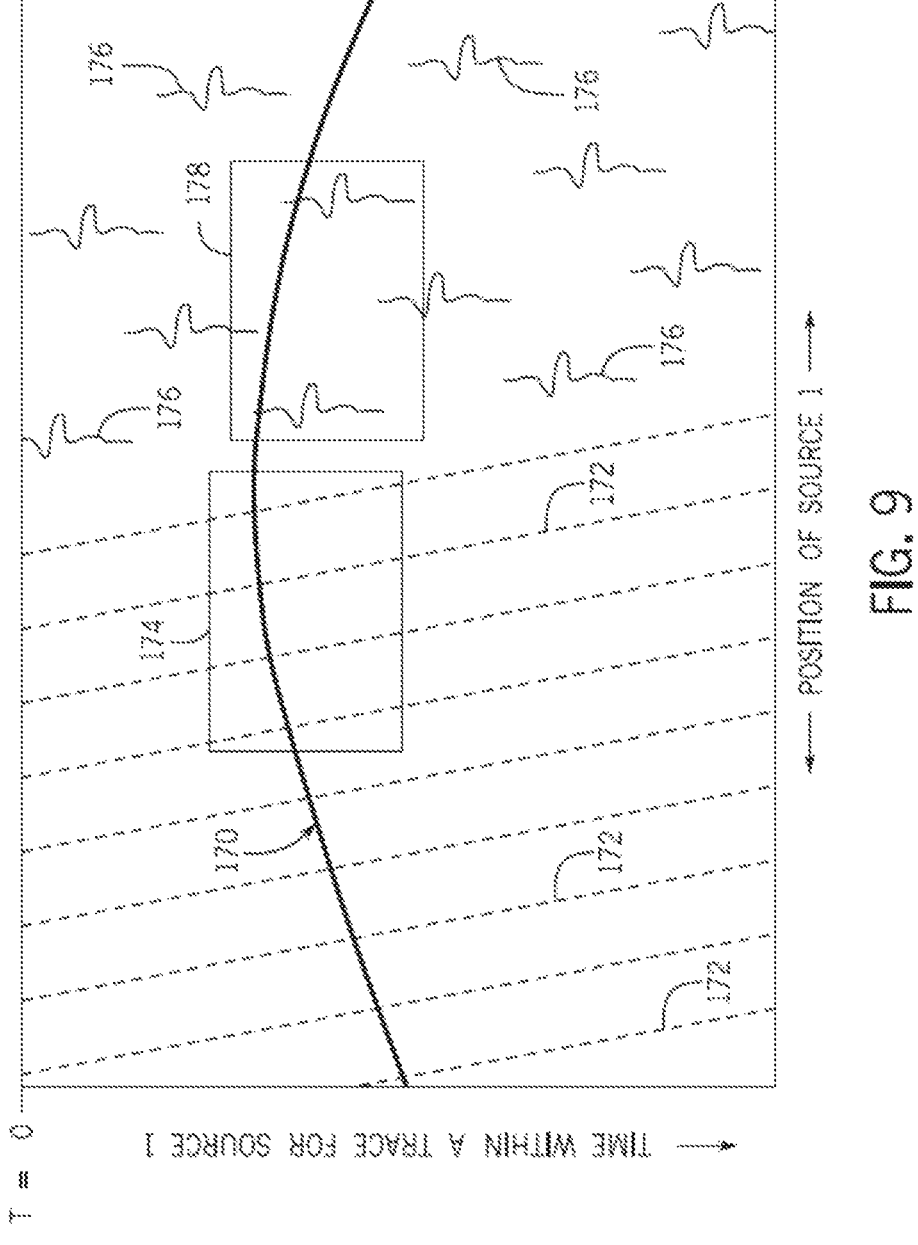
FIG. 9 illustrates a diagram of a gather (e.g., a common-receiver gather) associated with three interfering seismic sources, where each source operates on a different uniformly periodic operating schedule, in accordance with embodiments presented herein.

FIG. 9 illustrates an example of a gather combed using the initiation times of a first source on data from a survey that used at least 3 interfering sources 142. Event 170 represents an arrival generated by the first source 142. In this domain, event 170 is generally well-sampled, merely sloping within a certain range of the horizontal axis. Events 172 generated by the second source 142 (but combed according to the times of the first source 142) have steeper slopes relative to event 170. The steeper slopes may be indicative of, for example, general synchronization between the first source 142 and the second source 142 with the sources 142 moving at different paces (i.e., traveling at different speeds). Although the event 170 and the event 172 appear to be well-sampled within a coherency analysis window where they overlap (box 174 showing one such possible coherency window), the events due to the two overlapping sources may be separated based at least in part on an analysis of the differing dips of the events 170, 172, plus the source excitations of the event 172 are not in complete synchronization with the event 170, thus the event of 172 may not have a smooth curve and its coherence may not be as strong as the event 170. However, some events (e.g., events 176) may become relatively very aliased after combing to a particular initiation time (e.g., initiation time of the first source 142). In these cases, coherence—based signal extractions may reject the event (e.g., events 176), even if the analysis is done over an analysis window (box 178). Sometimes performing a dip-filtering operation as part of the coherency-based signal extraction may improve coherency-based signal extraction. After a dip-filtering operation, the undesired interfering event (e.g., events 176) may be identified by unphysically steep slopes, thereby facilitating the coherency-based signal extraction to converge (e.g., converge at a constant value representative of a final result) despite a regular periodicity of the sources 142.

If the interfering events have a markedly different signature, such as events 170 and 176, the coherency-based separation may be accomplished by analyzing the different sources 142 in different domains. For example, event 170 is impulsive but events 176 are smeared out in time. After appropriate filtering to shape the signatures, an additional analysis (e.g., combing of data set to the other source 142), generated event 170 may become smeared in time and events 176 may become impulsive. This may permit one or the other generated events 170 or 176 to be attenuated while maintaining the other via an appropriate sparseness constraint (e.g., coherency constraint).

Figure 10:
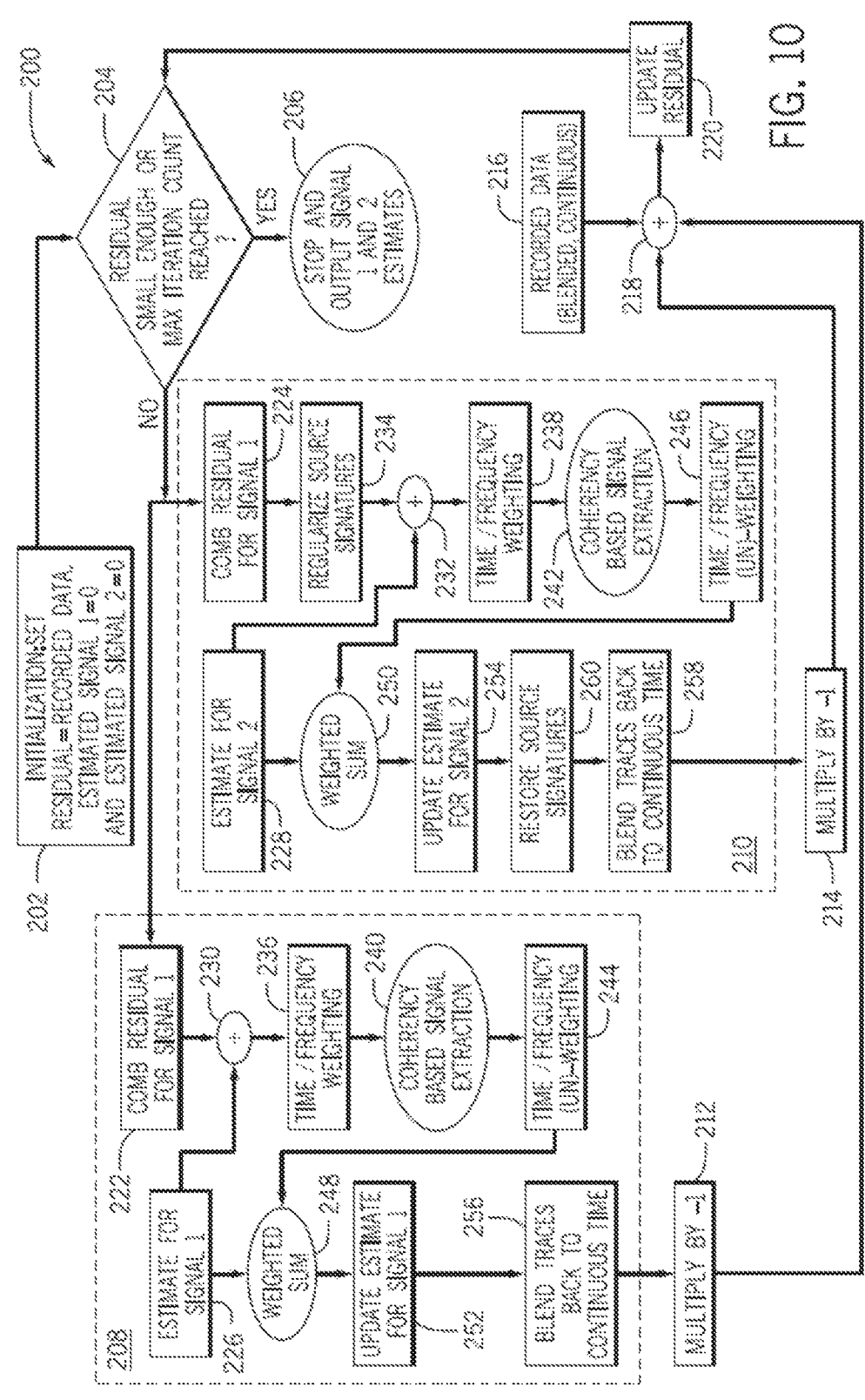
FIG. 10 illustrates a process used to preform coherency-based signal extractions and deblending operations in a representative case with a varying source signature based on an impulsive source and a vibratory source, in accordance with embodiments presented herein.

Having described the different types of sources, the general inversion model, and the types of desirable output seismic data, the description now turns to processes and methods useful in implementing the techniques. FIG. 10 illustrates a method 200 suitable for use when the sources 142 are part of a blended survey (e.g., a survey having two or more types of sources 142). Method 200 may be applied to additional or alternative types of sources 142, but for ease of discussion is described herein as applied to one or more airgun sources 142 and one or more seismic vibrator sources 142 (e.g., a Vibroseis survey). Those of ordinary skill in the art will readily appreciate how to generalize the method 200 to the case of three or more types of sources 142. The method 200 is discussed herein as including three nested layers, the outermost of which includes blocks 202, 204, 206, 208, 210, 212, 214, 216, 218, and 220. Although the method 200 is described as being performed by the computing system 60, it should be understood that any suitable computing device and/or processing device may perform the method 200. Although the method 200 is described in a particular order, it is noted that the method 200 may be performed in any suitable order.

At block 202, the computing system 60 may initialize a data set (e.g., initialization: set). The computing system 60 may generate or allocate in memory 66 a number of data buffers or data stores to store future calculation results. For example, three data buffers may be generated, where a first data buffer may store calculated residuals, a second data buffer may store deblended airgun data (e.g., signal 1), and a third data buffer may store deblended Vibroseis data (e.g., signal 2). The first data buffer may initially store a copy of the recorded seismic data (replaced after future calculations with a residual value), while the second data buffer and the third data buffer initially store zero data.

At block 204, the computing system 60 may determine whether deblending is complete. Deblending is iteratively repeated until an end condition is satisfied. For example, the end condition is satisfied when either a residual (e.g., a difference between actual recorded data and predicted separated data sets) is suitably small (e.g., equal to or less than a residual threshold) and/or when a maximum iteration count has been reached (e.g., equal to or greater than an iteration count threshold). If the end condition is satisfied, the computing system 60 stops deblending operations and outputs the deblended data (e.g., data stored in the second data buffer and the third data buffer) at block 206. When the end condition is satisfied, the computing system 60 may produce at least two source gather groups based on the interpolation operations and deblending operations. The at least two source gather groups may be respectively associated with data sets that are non-overlapping or with data sets that overlap only within the same source excitation group. The computing system 60 at block 206 may transmit the at least two source gathers for use in generating a seismic image.

Otherwise, at block 206, the computing system 60 uses the residual (e.g., first data buffer) in combing operations and deblending operations of block 208 and block 210. This may which represent an iteration of deblended source estimation performed for each interfering source 142 (e.g., once for airguns and once for Vibroseis, respectively). Each of these boxes may be individually analogous to the method described in U.S. Pat. No. 8,295,124 B2 by Abma, in particular the steps described in FIG. 8 of Abma in steps 815 to 875. The subject matter of U.S. Pat. No. 8,295,124 B2 is incorporated by reference herein in its entirety. The computing system 60 outputs an updated estimate of the recorded data may have been recorded if just the corresponding source type had been active (e.g., the airgun for 208, and the Vibroseis for 210) to use in multiplication operations of blocks 212 and 214.

The computing system 60 may negate the updated estimates of the recorded data (e.g., multiplication operations at blocks 212 and 214), and may add the updated negative estimate from the airgun data (e.g., output from block 212), the updated negative estimate from the Vibroseis data (e.g., output from block 214), and the recorded data (e.g., represented by block 216) at block 218 via summation operations, generating an updated residual the computing system 60 may store the newly updated residual in its corresponding data buffer (e.g., first data buffer) at block 220 and, at block 204, may repeat a determination of whether deblending operations are complete. The computing system 60 may repeat the method 200 until the end condition is met. Note that if the prediction were perfect, unblended single-source-type predictions (e.g., outputs associated with the block 212 and the block 214) may sum, at block 218, to the actual recorded data, and the newly updated residual is zero. The deblending operations described herein generally produce an improved result relative to other acquisition techniques. For example, the described deblending operations are relatively faster, where a shorter acquisition time may translate into a smaller amount of noise for an equivalent quantity of signals.

The intermediate layer of the method 200 may include the operations performed within the blocks 208 and 210. At a block 222 and block 224, the computing system 60 may perform combing operations on the residual (e.g., block 222 corresponds to combing the residual using the airgun times, and block 224 corresponds to combing the residual using the Vibroseis times). The computing system 60 may, at block 226 and block 228, access the buffers storing the current estimated deblended data (e.g., block 226 for the airgun, and block 228 for the Vibroseis) and, at block 230 and block 232, sum each current estimated deblended data with its corresponding combed residual (e.g., at block 230 for the airguns and at block 232 for the Vibroseis). The Vibroseis processing sequence includes an extra operation performed by the computing system 60, at block 234, to regularize the source signature. The computing system 60 may regularize the source signature via a signature deconvolution, signature correlation, matching filter, or the like.

When separating different types of sources, it may be desired to balance their amplitudes, otherwise one source type may dominate over the other and the method may not converge. Thus, at block 236 and block 238, the computing system 60 may balance the relative strengths of the different types of sources 142 and/or attenuate frequencies not produced by the corresponding source 142 (e.g., block 236 for the airgun and block 238 for the Vibroseis). Attempting to produce a coherent signal that is not there, for example attempting to find coherent signal above 4 Hz for a low-frequency source that produces little to no energy in that frequency band, may be generally inefficient. Furthermore, attempting to do so may accentuate noise which may cause the method 200 to not converge at a usable result. Thus, the modified method includes an additional time and/or frequency weighting operation to attenuate frequencies not produced by the corresponding source 142 (e.g., block 236 for the airguns, and block 238 for the Vibroseis).

The computing system 60, at block 240 and block 242, may smooth the data to extract coherent signals (e.g., block 240 for the airgun, and block 242 for the Vibroseis). At block 240 and 242, the computing system 60 may perform a coherent signal extraction (e.g., block 240 for the airgun, and block 242 for the Vibroseis). The computing system 60 may separate the interfering source excitations into at least two separate source gathers based at least in part on a threshold parameter (e.g., a threshold amount). The threshold parameter may correspond to an amount of overlap between the interfering source excitations which permits at least a first coherency parameter (e.g., constraint) and an interpolation operation (e.g., described in FIG. 12) to be used to separate at least a portion of data for the first seismic source 142 from at least an additional portion of data for the second seismic source 142. In some embodiments, the computing system 60 may, at blocks 244 and/or 246, perform additional time and/or frequency (un)weighting to remove at least in part (e.g., partially or wholly) weights previously applied at blocks 236 and/or 238. However, the computing system 60 may not remove weights applied to suppress noise. The result is an update to the estimated deblended signal that the computing system 60 may, at blocks 248 and 250, add to the previous estimate (e.g., received respectively from blocks 226 and 228) to produce updated deblended signal estimates for the airguns and Vibroseis. The computing system 60 may store updated deblended signal estimates in the respective data buffers, at block 252 and block 254 (thereby updating the estimates for signal 1 stored in the second data buffer and signal 2 stored in the third data buffer respectively received at block 226 and block 228). The computing system 60 may respectively blend the deblended traces, at blocks 256 and 258, for the airguns and Vibroseis. The Vibroseis flow (e.g., block 210) may include the computing system 60, at an additional block 260, removing the source signature (e.g., applied at block 1416).

Figure 11:
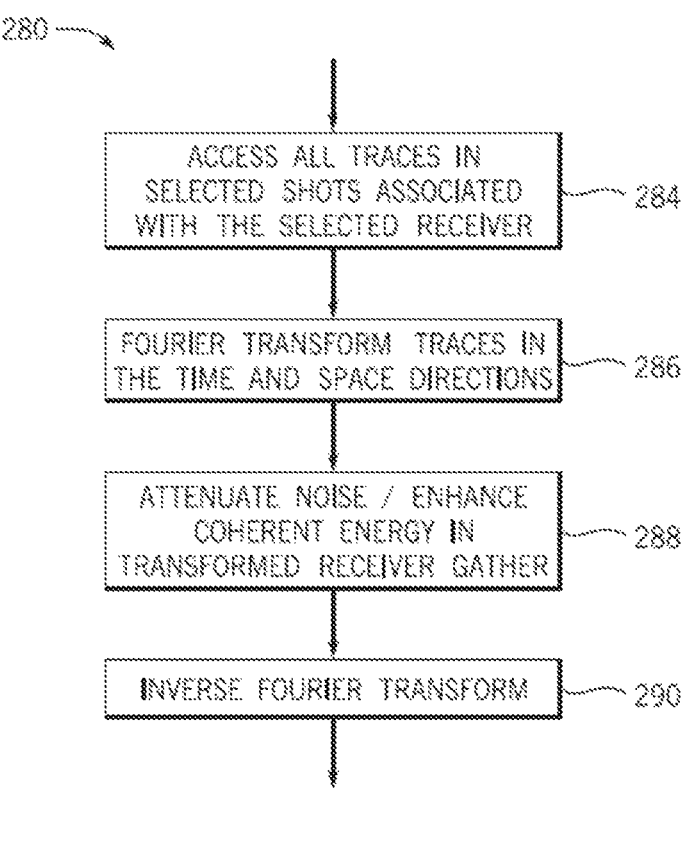
FIG. 11 illustrates an example process for extracting coherent signals from a noisy gather to be used in accordance with the process of FIG. 10, in accordance with embodiments presented herein.

The innermost layer of the method 200 may occur inside blocks 240 and 242, when the computing system 60 performs a coherency-based signal extraction (e.g., a coherent signal extraction). To elaborate on the operations performed by the computing system 60 during the coherency-based signal extraction, FIG. 11 illustrates a method 280 including operations performed by the computing system 60 to perform a coherency-based signal extraction at blocks 240 and 242. Although described as being performed by the computing system 60, it should be understood that any suitable processing device and/or computing device may perform the operations described herein. It is noted that the method 280 represents a standard approach of coherency-based signal extraction for a single source example, and thus the method 280 may represent operations associated with blocks 240 and/or 242. Although the method 280 is described in a particular order, it is noted that the method 280 may be performed in any suitable order. Although the method 280 is described using Fourier Transform for the coherence filtering, it shall be noted that the Fourier Transform may be substituted with other sparsity promoting methods, such as Radon Transform, Singular Vector Decomposition, Singular Spectrum Analysis, etc.

At block 284, the computing system 60 may access all traces in selected shots associated with a selected receiver 140. The computing system 60 may organize the data into an appropriate gather corresponding to its source 142. At block 286, the computing system 60 may perform a Fourier Transform on the traces of the gather in the time and space directions, such that the desired signal may become "sparse" in that domain. At block 288, the computing system 60 may attenuate noise (e.g., non-coherent signals, weak-coherence signals) and/or enhance coherent energy (e.g., coherent signals) in the transformed gather. In this way, smaller values in the transformed space may be zeroed while leaving the coherent signal untouched while attenuating the noise. At block 290, the computing system 60 may perform an inverse Fourier Transform to return the data in the transformed gather to its original domain.

The computing system 60 may generally segment data into overlapping N-dimensional subcubes, with appropriate tapering in the overlap zones. In these embodiments, the computing system 60 may perform the method 280 for each subcube, and the results of each respective performance of the method may be merged back together to reconstitute a de-noised version of the original data.

Indeed, an additional method 300 may be an improved method of deblending different types of data relative to the operations of the method 280. FIG. 12 depicts a method 300 that may be used to perform improved deblending operations relative to the method 280. This improved method 300 may leverage identification of the overlapping (e.g., events 176 of FIG. 9) to mask out and/or selectively attenuate weak-coherence signals of the gather. Generally, this method 300 marks contaminated portions of data or traces as "dead" or "missing," and leverages methods for filling in missing data via interpolation to replace the contaminated traces with suitable data. The method 300 generally leverages a projection onto convex sets (POCS) interpolation to predict values to be replaced within the gather for the contaminated traces (e.g., non-coherent signals), however any suitable interpolation method may be used. Although the method 300 is described in a particular order and performed by the computing system 60, it is noted that the method 300 may be performed by any suitable processing circuitry or processor.

At block 304, the computing system 60 may access all traces in selected shots associated with a selected receiver 140. The contaminated and/or missing traces may be previously identified, and thus this information may also be retrieved in block 304. The computing system 60 may organize the data into an appropriate gather where the desired signal is to be coherent. It noted that in some embodiments, each of seismic source 142 may include multiple sources. For example, an air gun source may include four air gun arrays (e.g., multiple sources, seismic source groups), each generating many shots. Furthermore, since air guns may sometimes generate shots via sources having differing frequency spectrums, or via sources having differing survey geometries, it may improve processing operations of the method 200 to apply different constraints onto the traces of the selected shots based on the particular frequency spectrum and/or survey geometry of the source. Customizing processing based on the source may improve the organizing of the data into appropriate gathers. At block 306, the computing system 60 may generate and apply, as block 307, a mask corresponding to overlapping signals (e.g., overlapping data from interfering sources 142) of the gather data to attenuate noise and/or enhance coherent signals in the transformed gather. In this way, the noise or overlapping signals generated by the other interfering sources 142 (e.g., low frequency source signals interfering with air gun source) may be initially zeroed while leaving the coherent signal and the signal interfered by the same source (e.g., air gun on air gun blending noise) untouched. After the first iteration, the noise or overlapping signals are not zeroed. Instead, the noise or overlapping signal may be replaced with the interpolated signals from previous iteration at block 312 after Inverse Fourier Transform. At block 308, the computing system 60 may perform a Fourier Transform on the traces of the gather in the time and space directions, such that the desired signal may become "sparse" in that domain. At block 310, the computing system 60 may threshold the data after Fourier Transform at block 308 via thresholding operations (e.g., threshold operations), such that values above a given threshold value(s) may be preserved. These values may correspond to relatively higher coherence signals. The threshold value(s) may change throughout the iterations to include lower coherence signals in later iterations. At block 312, the computing system 60 may perform an inverse Fourier Transform to return the data in the transformed gather to its original domain. The masked signals may be partially interpolated after the inverse Fourier Transform in subsequent iterations until the full signals are reconstructed at the last iteration.

In some embodiments, the seismic acquisition is performed with seismic sources 142 positioned on an irregular or non-uniform grid, either due to surface terrain or by acquisition design. It may be desired to interpolate the source position to regular grids. For example, the regularization and interpolation may improve coherency of primary signals for source deblending and/or may help image subsurface structure for geology interpretation. In such case, interpolation operators may be added to the method 300. The interpolation operators may estimate the signals on non-uniform grid (e.g., irregularly spaced) based on the signals on a uniform grid (e.g., regularly spaced) or estimate the signals on the uniform grid based on the signals on a non-uniform grid (e.g., irregularly spaced). The interpolation operator may be applied in block 308, such that the spatial Fourier Transform is performed on signal traces on the uniform grid. Another interpolation operator may be applied in block 312, such that after the inverse Fourier Transform the signal traces are on an original non-uniform grid. In this way, the computing device 60 may reconstruct signals back to an original non-uniform grid based on the predicted signals in the uniform grid, when the signals are acquired in the non-uniform grid. In some embodiments, the computing device 60 may reconstruct signals acquired in a uniform grid and reconstruct the signals back into a non-uniform grid.

In some embodiments, the unmasked signals may be acquired without overlapping with other signals generated by the same source type 142. In such a case, the unmasked signals are not contaminated by blending noise, thus the interpolation operations may be iterated to complete the prediction of the masked signal. Blocks 308, 310, and 312 make up a POCS interpolation process. Blocks 314, 316, and 318 may be performed to complete the interpolation operations. In some other embodiments, the unmasked signals may be acquired with overlapping, resulting to interfering noise or weak coherence (such as air gun on air gun blending noise). In such a case, the interpolation operations may be iterated while separating (deblending) the overlapping signals, the block 312 output may be transferred to block 246 to continue the deblending inversion.

At block 314, the computing system 60 may apply predictions from the block 312 to the gather based on the nulls of the mask. In this way, the computing system 60 may reference at least in part the mask generated at the block 308 to determine where to insert the predictions from the block 312 into the gather (e.g., where the gather previously had zeroed or nulled data for the weak-coherence data). In some embodiments, a subset of the predictions are used when inserting the predictions into the gather (e.g., a subset corresponding to the missing data, rather than including data predictions corresponding to non-missing data of the gather that may or may not have been altered during the missing data interpolation).

At block 316, the computing system 60 may apply original values to the gather based at least in part on the non-null values of the mask (e.g., live flags for each selected trace and/or sample) via data 307. In this way, the computing system 60 may reference at least in part the mask generated at the block 308 to determine where to insert or apply the original data to the gather. In some embodiments, the original data corresponding to the non-null values of the mask are untouched and continue to remain within the gather, thus operations at this block may be skipped based on the embodiment. For operations at the block 318, the computing system 60 may access, via data 307, live and/or dead flags (e.g., the null values of the mask and/or the non-null values of the mask) for each selected trace and/or sample. At block 322, the computing system 60 may compare the result of the predictive-based processing to either the original gather, or a previous result (e.g., if method 300 has been performed at least once) to determine if the current output gather (e.g., output from operations performed at block 316) has converged. When the current output gather values have converged (or a maximum iteration count threshold is exceeded), the computing system 60 proceeds to continue the method 200 at the block 246 and/or 244. Otherwise, the computing system 60 proceeds, at block 308, to repeat the Fourier Transform on the traces of the current gather (e.g., output from operations performed at block 316) including the newly predicted "missing" traces.

It is noted that although FIG. 10 (and thus, FIG. 11 and FIG. 12) depicts the two sources corresponding to separate processing blocks (e.g., block 208 and 210), in some embodiments, one source may be identified and used to determine the data for the other source. For example, airgun data may be deblended and interpolated to separate interference from a second source 142, and thus may be used to subtract from the data of the second source 142 to remove noise generated in the data of the second source 142 by interference from the airgun data. Data of the other source may also be determined via adjusting weight functions used in operations of blocks 234 and 236 in such a way to cause one of the weight functions to be initially set to be zeros and the other weight function to be initially set to ones. These weights may be maintained until the inversion of the other source 142 completes or reaches a reasonable point in interpolation operations and/or deblending operations. When the interpolation operations and/or the deblending operations end, the weight function initially set to zeros may be increased to ones. The weight functions may increase a flexibility of the described operations by improving an efficiency of switching between sources used in interpolation and/or deblending operations.

Even though FIG. 10 (and, thus, FIG. 11 and FIG. 12) depicts the process of separating signals generated by two type of sources, it does not exclude the case of signal source type. A portion of the source excitations from the single source type may be treated as a first source (e.g., source 1), and another portion of the source excitations from the same source type may be treated as a second source (e.g., source 2). It should also be noted that the number of source types is not limited to two, and thus any number of portions of the source excitations from the same source type may be treated as a corresponding number of sources.

Figure 13:
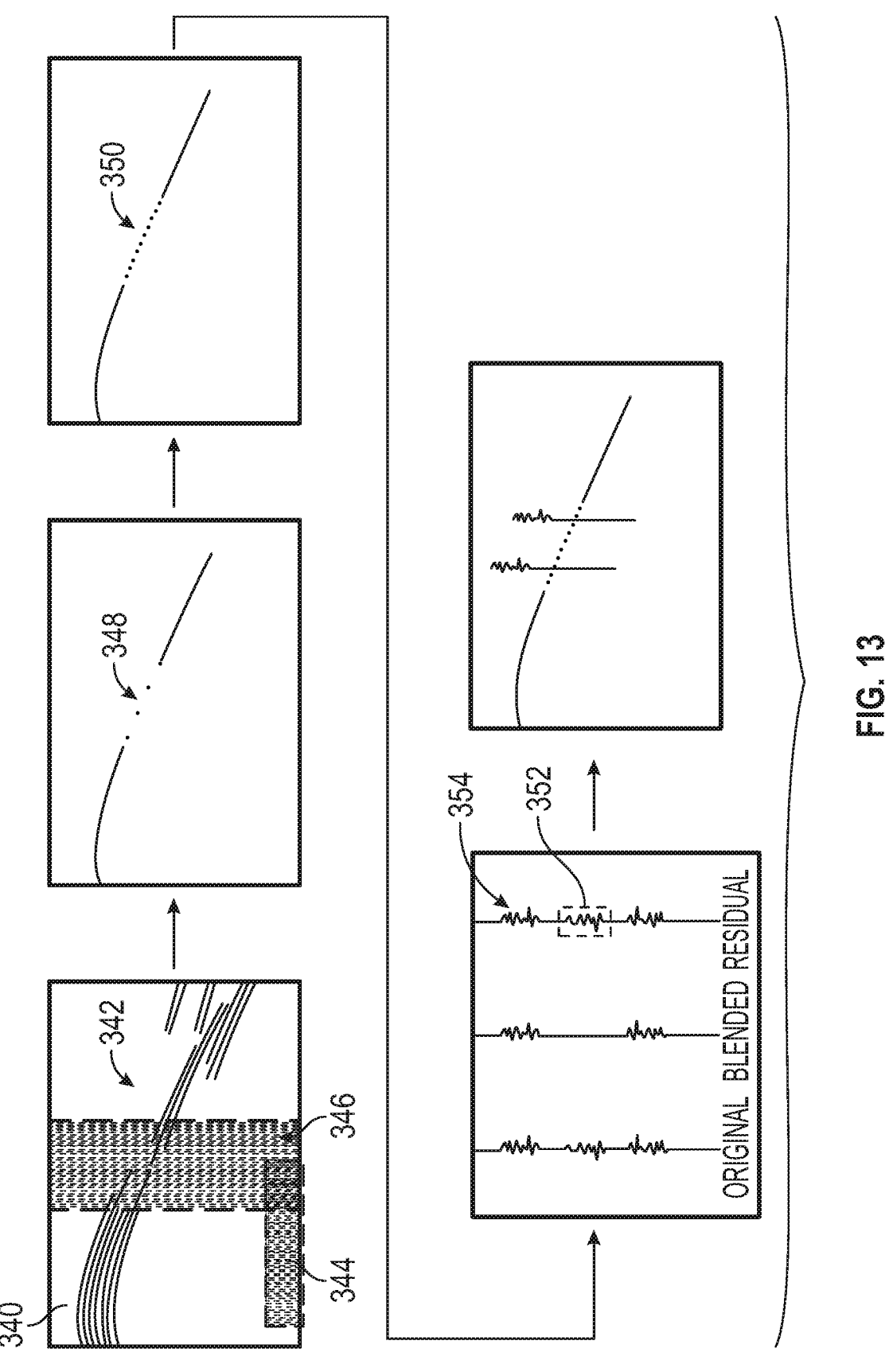
FIG. 13 illustrates a graphic depicting intermediary results from the example process of FIG. 12, in accordance with embodiments presented herein.

FIG. 13 illustrates a diagram depicting outputs from the method 300. The coherent signals 342 and the weak-coherence signals 344 and 346 described below may result from at least partially overlapping of data received from the interfering sources. In this way, the weak-coherence signals or portions (e.g., "dead" traces or portions) may correspond to where data of a first source 142 overlaps with at least some data of a second source 142. Although the processing described herein may be applied across many or all data gathered via the receivers 140, for ease of discussion the methods of FIG. 12 are applied and described below relative to an example receiver gather. The computing system 60 is described herein as performing the processing represented via FIG. 13, but it should be understood that any suitable computing or processing device may be used to perform the represented processing. It is noted that since FIG. 13 illustrates at least a portion of the method 300, additional or fewer operations may be performed to the data set to generate a final data set, such as the Fourier Transform of the block 308 with or without interpolation operator and/or the inverse Fourier Transform of the block 312 with or without interpolation operator. It may also be noted that the two-dimensional receiver gather 340 in FIG. 13 is provided as an example, and the systems and methods described herein should not be limited to a two-dimensional receiver gather and may be suitably applied to any dimension receiver gather.

Thus, the computing system 60 may perform a first processing operation to access traces in selected shots asso-ciated with the selected receiver (e.g., block 304). An example result of the first processing operation may be depicted in a first subplot of FIG. 13. The computing system 60 may access the receiver gather 340 to identify noisy portions of the receiver gather 340. The noisy portions of the receiver gather 340 may be contaminated by another type of seismic source 142, such as vibratory source (e.g., represented via box 346). The weak-coherence or noisy portions of the receiver gather 342 may correspond to two or more overlapping seismic source excitations from interfering sources 142. In this way, the computing system 60 may perform a second processing operation to generate and apply a mask (e.g., block 306) after combing the traces of the selected shots into the receiver gather 340. An example result of the second processing operation may be depicted in a second subplot of FIG. 13. Notice that the remaining data may still include weak-coherence portions, due to the over-lapping seismic source excitations from the same seismic source 142 (e.g., represented via box 344). A mask may be generated in a way that its value is equal to zero for at least a portion of a region where there are overlapping seismic source excitations from a different interfering source 142, and its value is equal to one for everywhere else. In the case that the same seismic source 142 does not generate blending noise (or overlapping source excitations), it may be convenient to interpolate and fill in the zones where the signals have been masked. The computing system 60 may perform a third processing operation to Fourier transform traces in time and space directions, perform thresholding (e.g., threshold) operations, perform interpolation operations, and perform inverse Fourier Transform operations (e.g., blocks 308, 310, 312, 314). An example result of the third process-ing operation may be depicted in a third subplot of FIG. 13. However, interpolation itself may not be effective to inter-polate the masked zones without the contamination of blending noise (e.g., the noise in box 344). In such a case, the joint operation of deblending and interpolation may be more effective than interpolation itself.

The iterative Fourier Transform, thresholding and inverse Fourier Transform in FIG. 12 work for both deblending and interpolation. Thus, the deblending and interpolation opera-tions may be performed at least partially at a same time. The residual (initially set to be the original recorded data) is first multiplied by a mask to remove the blending noise generated by another source type, leaving gaps on the receiver gather 340, as depicted by gaps 348. The residual, or a weighted sum of the residual and the previous iteration of primary signal estimate, may be transformed into FK (Frequency-Wavenumber) domain by Fourier Transform. When the sources are excited on irregular or non-uniform grid, the computing system 60 may apply an interpolation operation (e.g., linear, polynomial, sinc, trigonometric polynomial, or the like interpolation operations) to improve the coherency of primary signals.

After the computing system 60 performs thresholding operations in FK domain and the inverse Fourier Transform operations, the gaps 348 may be partially infilled (e.g., represented via 350) with the information nearby. After every iteration of inverse Fourier Transform, the computing system 60 may estimate a subset of primary signals, and the masked zones may infill based on the continuity of nearby signals. The primary signal estimate is thus updated with previous iterations of estimates (e.g., by a weighted sum). The primary signal estimate may be blended based on the times of source excitations and subtracted from original data recording. The computing system 60 may generate an updated trace 354 based at least in part on a difference between an original data recording and a predicted data recording generated via the blending of primary signal estimate. When the sources are excited on irregular or non-uniform grid and an interpolation operator has been applied to regularize signals onto regular/uniform grid, another interpolation operator (such as linear, polynomial, sinc, trigonometric polynomial, or the like interpolation operations) may be applied to reconstruct the primary signals on the original irregular/non-uniform source grid.

The residual may grow smaller via each iteration of deblending operations and interpolation operations, except the residual 352 corresponding to the blending noise generated by the source excitations of the other seismic source 142. An example of the residual 352 may be depicted in a fourth subplot of FIG. 13. After combing the residual 352 to receiver gather 340, the computing system 60 may apply the mask again to remove the blending noise from the other seismic source 142. The computing system 60 may continue on to repeat the Fourier Transform operations, thresholding operations, and inverse Fourier Transform operations to continue the deblending operations and interpolation operations, as described above. In this way, the residual may be updated and blended at each iteration without interpolation operations adjusting the data corresponding to the second source (e.g., signals 346). Over one or more iterations, the data corresponding to the second source (or other source, based on to which source the receiver gather 340 is combed) is filtered out. An example result of the output to be adjusted during the repeated deblending operations and interpolation operations may be depicted in a fifth subplot of FIG. 13.

Thus, with the foregoing in mind, some of these operations (e.g., operations of the method 200 and the method 300) may be described by way of one or more mathematical equations. Mathematically, in some embodiments, the recorded data may be represented via Equation 1.

$$d = \sum_{i=1}^{n} \Gamma_i m_i \quad [1]$$

In Equation 1, n is the number of source types, d represents the continuous recorded data containing overlapping signals, $m_i$ represents data traces for source type i that may have been recorded in a conventional one-source-at-a-time seismic experiment where the data for each source activation is in a separate trace, and $\Gamma_i$ is a blending operator for source type i that sums together the traces in the desired unblended data, $m_i$, using the known source activation times to create the continuous blended data. The blended recorded data, d, may be used to determine (e.g., estimate) the desired unblended data, $m_i$. The process of estimating $m_i$ is sometimes called deblending. The desired unblended data, $m_i$, may be used in further processing just as if the data had been recorded in separate, unblended surveys. In the case of a continuously sounding source, the source activation times may be specified on a convenient regular repeating interval, and the blending operator, $\Gamma_i$, may include suitable tapering such that the consecutive "source points" sum back together to reconstitute the continuous source signal.

As represented in a computer system, the blended recorded data, d, may be represented as an array with dimensions of sample time and receiver number, or other suitable identifier of the receiver 140. In some embodiments, the time axis may be subdivided into records of fixed length. For example, continuous time may be subdivided into traces one minute long, splitting the time axis into two dimensions, "minute" and "time sample within the minute." The desired unblended data, $m_i$, may be an array that associates sample time, source activation number, type of source, and receiver number (or other identifier of the receiver 140). The blending operator, $\Gamma_i$, may also associate the sample time (possibly subdivided into two dimensions), the type of source, the source activation number, and the receiver number (or other identifier of the receiver 140). The blending operator, $\Gamma_i$, and/or the desired unblended data, $m_i$, may be large but sparsely populated arrays, and as such may be represented in software applications on a computer via a function call. In this way the blending operator, $\Gamma_i$, and/or the desired unblended data, $m_i$, may not be stored as a large static matrix (e.g., instead elements may be calculated from a table of source initiation times).

In some embodiments, the desired unblended data, $m_i$, may represent "a complete survey," with a trace for every possible combination of type of source, source position, and receiver. Source-receiver combinations that did not actually occur in the survey (and thus are not represented in the blended recorded data, d) correspond to zeroes in the blending operator, $\gamma$, and/or the desired unblended data, $m_i$.

In some embodiments, the desired unblended data, $m_i$, may include traces interpolated by the deblending process to fill in the acquisition gaps. Interpolation may also be used to replace recorded traces for which the shot and/or received signal were insufficient in performance that the corresponding trace is best treated as "missing." "Missing" traces may be replaced and have values suitably predicted based at least in part on predictive interpolation operations and/or deblending operations of the method 300.

In some embodiments, the desired unblended data, $m_i$, may include traces only for the source-receiver combinations that were actually acquired in the survey. Intermediate cases are also possible, with the desired unblended data, $m_i$, representing a "complete survey" for some source 142 types, but the source-receiver combinations that were actually acquired for other source 142 types.

In any case, the problem may be considered underdetermined, with more entries in the desired unblended data, $m_i$, to solve for than there are unique elements in the blended recorded data, d. Some assumptions may be made to solve this problem. The solution is to observe that the recorded data is to vary smoothly as a function of source and receiver position for a given source, and to use this to constrain the desired unblended data, $m_i$, also called the "model data." For this to work, the data is to be acquired in such a way to ensure that arrivals from different sources are not coherent with each other, typically by introducing time dithering into the source initiation times. The time dithering information may be included in the blending operator, $\Gamma_i$.

In some embodiments, FT represents a Fourier Transform (e.g., a fast Fourier Transform, "FFT"). For irregularly spaced shots, FT may be calculated with discrete Fourier Transforms or some other method that permits the irregular sampling of the shots. In some embodiments, FT may include a multi-dimensional (e.g., 3-D) Fourier Transform and a thresholding operation to remove weak events, which tend to be noise or weak-coherence signals, and pass the strong events, which tend to be coherent signals. Processing that includes use of the Fourier Transform, FT, may improve the coherency of recorded seismic signals.

The method may extract time windows from the data d that correspond to source activations followed by a listening time interval. This extraction of time windows may be referred to as "combing the blended recorded data, d." When there is no overlap of data from separate source activations, combing the data directly produces the desired unblended data, m. This scenario corresponds to conventional single-source seismic processing. Mathematically, Equation 2 may apply here.

$$m_{comb} = \lceil^t M(d)$$ [2]

In Equation 2, the combing operator, $\Gamma^t$, is the transpose of the blending operator, $\Gamma$, and M(d) represents the remaining data of the blended recorded data, d, after an application of a mask, M (or the residual data). Where the sources do overlap, the traces in the combed data, $m_{comb}$, without application of the mask M (e.g., $m_{comb}=\Gamma^t d$) may be contaminated with crosstalk from the other source(s). However, the application of the mask, M, eliminates at least a portion of data corresponding to overlap between the sources. The mask, M, is a mask vector that includes components corresponding to null (e.g., 0) where the source data overlaps and corresponds to non-null (e.g., 1) everywhere else in the mask vector. Although the Mask M is applied to remove crosstalk noise from the other source(s), the crosstalk noise from the same source generated at least in part due to overlapping source activation and recording time remains in the data. Because combing is performed on masked data (e.g., M(d)) and because of time dithering of the source activations, any crosstalk noise between sources 142 is tuned or remains as weak-coherence signals. It is noted that the crosstalk noise and/or blending noise is energy that corresponds to primary signals when aligned to its own source excitation time. Thus, once the computing system 60 extracts primary signals from the combed data gather, the computing system 60 may accurately predict the crosstalk noise and/or blending noise to be subtracted out. The process of extracting the primary signals may be an iterative process. In this way, primary signals that are relatively stronger may be extracted before any corresponding crosstalk noise and/or blending noise is subtracted from the original data. The extraction of strong primary signals may be done in any sparsity-promoting transform domain, such as FK transform, Singular Value Decomposition (SVD), or the like. The strong primary signals may be extracted by applying a sparsity-promoting transform thresholding operation, such as taking the Fourier Transform of Equation 2 (e.g., FT[$\Gamma^t$M(d)]), to retain the strong values which correspond to coherent or smooth signals, then applying inverse transform, thus removing non-smooth and/or weak-coherence signals (e.g., energy) of the blended recorded data, d.

Extracting coherent primary signals via the Fourier Transform (or other sparsity-promoting transform) may create a partial estimate of the unblended data, $m_{estimate}$. The unblended data is determined by performing thresholding operations (e.g., T) on the result from the Fourier Transform, as represented via Equation 3. In Equation 3, d is replaced with a residual, r, as described later.

$$m_{estimate} = T(FT[\lceil^t M(d)])$$ [3]

$$m_{estimate} = T(FT[\lceil^t M(r)])$$ [3a]

For example, the unblended data, $m_{estimate}$, may be an improved estimate relative to unblended data resulting from performing the thresholding operations on a result from a Fourier Transform performed on data including the crosstalk and/or overlap (e.g., $m_{estimate}$=T(FT[$\Gamma^t$d])). In every iteration, partial unblended data is estimated and combined with previous iterations of estimates. To facilitate convergence, a stabilization parameter, n, may be used to limit how much the updated unblended data estimate, $m_{update}$, receives from each iteration of the unblended data estimate, $m_{estimate}$ (e.g., represented via Equation 4) and thus is able to stabilize the result (e.g., such as over time when using an iterative approach).

$$m_{update} = m_{save} + (m_{estimate}/n)$$ [4]

Ultimately, the unblended data output, $m_{update}$, may be used to determine a resulting data residual, r, relative to the initial non-overlapping data from the data set d (e.g., M(d) →M($\Gamma$($m_{desired}$), where $m_{desired}$ represents the original uncovered unblended data set (or unblended data set from a previous iteration) corresponding to the current source data set being processed), such as represented via Equation 5. If the data residual, r, at the end of the iteration equals zero, the processing did not make any further update to the data set, and thus processing of the data set is complete.

$$r = M[d] - M[\lceil(m_{update})]$$ [5]

Additionally or alternatively, at each iteration of the methods described above, a computing system 60 performing the methods may save the updated unblended data estimate, $m_{update}$, from the previous iteration (e.g., saved as $m_{save}$) and a proposed updated version of the unblended data, $m_{update}$, from the current iteration (e.g., saved as $m_{proposed}$). The computing system 60 may calculate a weighted average of these two versions of the unblended data set to use as the new update using an Equation 6.

$$m_{update} = (1 - \lambda)\, m_{save} + \lambda\, m_{proposed}$$ [6]

In Equation 6, the weighting factor, $\lambda$, may be a positive value but not greater than one over maximum blending factor (e.g., maximum number of overlapping sources present in the blended recorded data, d, being processed). Every trace in the desired unblended data, m, corresponds to a particular source-receiver pair, so the method may use weighting term $\lambda$ determined to be a function of source, receiver, offset, time, or the like. More generally, the weighted average may also be applied in a transformed domain. In this way, the weighting term $\lambda$ may also be a function of frequency, or the like, as is the case in Equation 7, where FT and $FT^{-1}$ indicate a Fourier Transform and inverse Fourier Transform, respectively.

$$m_{update} = FT^{-1}[(1 - \lambda)\, FT(m_{save}) + \lambda\, FT(m_{proposed})]$$ [7]

These techniques described herein may permit a suitable analysis of a data set common between two or more sources, even when the data for the two or more sources is overlapping and potentially generating weak-coherence portions of data. Thus, these techniques described herein may improve simultaneous source acquisition for the cases of at least two sources because data may be predicted and used to assign portions of the data set to the respective sources when it otherwise may not be recoverable.

The above descriptions may illustrate one or more embodiments. Indeed, those of ordinary skill in the art should readily see how to generalize the systems and methods of those embodiments described herein to other cases, and how to incorporate alternative options into the basic workflow. It is noted that Abma demonstrated two approaches: a constructive approach and a deconstructive approach. The same possibilities apply here. The above disclosure has described the generalization of the "constructive approach" to data sets of two or more mixed source types. Those of ordinary skill in the art should readily be able to see how to similarly generalize the methods described here to use the "deconstructive approach." Equation 3a may be turned into Equation 3b, as following.

$$m_{propose} = T(FT[[\Gamma'M(r + m_{update})]])\qquad\text{[3b]}$$

The different options described in the preceding paragraphs (both for the outer signal separation algorithm and the coherency-based signal extraction algorithms that are repeatedly used within it) may be combined in a variety of permutations. Clearly many methods are possible, depending on the number and types of sources, their acquisition geometries, the choice of grid to represent the result, the frequency range under consideration, the signatures and spacings of the sources, and/or the desired application.

It should also be noted that when operations are performed on traces of a particular type (e.g., a receiver gather), it is normally not necessary to bring those seismic traces together in memory (e.g., via a sorting operation) in order to apply multi-trace processes to them. Thus, in the disclosure above and the claims that follow, when it is said that a gather (e.g., shot gather, receiver gather, or the like) is assembled or accessed for further processing, those words should be interpreted in their broadest sense to cover instances where the traces that include the gather are processed in place or on the fly. Thus, no sorting or other arranging of the data may necessarily be used.

In some embodiments, these techniques may be adapted for use with a vertical seismic profile (VSP) or similar downhole survey. By way of explanation, those of ordinary skill in the art understand that VSP acquisition may be very expensive in terms of rig down time. Shooting faster VSPs with overlapping sources may be used to significantly reduce the costs of such surveys. Thus, when the phrase "blended seismic survey" is used herein, that phrase may be broadly interpreted to include both land and marine 2-D and 3-D surveys as well as VSPs, cross hole surveys, or the like.

Furthermore, in the previous discussion, the language has been expressed in terms of operations performed on conventional seismic data. But, it is understood by those skilled in the art that the disclosure herein described may be applied advantageously in other subject matter areas, and used to locate other subsurface minerals besides hydrocarbons. By way of example only, the same approach described herein may be used to process and/or analyze multi-component seismic data, shear wave data, converted mode data, cross well survey data, VSP data, full waveform sonic logs, controlled source or other electromagnetic data (controlled source electromagnetic (CSEM) surveying, t-CSEM, etc.), or model-based digital simulations of any of the foregoing. Additionally, the methods claimed herein after may be applied to mathematically transformed versions of these same data traces including, for example: filtered data traces, migrated data traces, frequency domain Fourier transformed data traces, transformations by discrete orthonormal transforms, instantaneous phase data traces, instantaneous frequency data traces, quadrature traces, analytic traces, etc. In short, the process disclosed herein may be applied to a wide variety of types of geophysical time series, but it is preferably applied to a collection of spatially-related time series.

Technical effects of this disclosure include systems and methods for reducing weak-coherence signals (e.g., non-coherent blending noise) of a data set that may affect seismic data processing of the data set. These weak-coherence signals may be discarded based at least in part on an inability to interpret a signal expected at the position in the data set of the weak coherence signal. However, by using joint deblending and interpolation to predict values to be used as the weak coherence signals and using the predicted values to replace the weak coherence signals within the data set, seismic data processing operations may improve. Resulting gathers which include the predicted values as replacement data for the weak coherence signals may be relatively clean gathers (in comparison to a gather that does not include the replacement data) that may be used both for imaging, prestack analysis such as AVO (Amplitude vs. Offset) analysis, and velocity-model building, for example, by Full-Waveform Inversion (FWI). Thus, these recovery and processing operations described herein may cause improved data inputs into seismic image generators. When data inputs into the seismic image generators are improved, the resulting seismic image may also improve, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of seismic exploration above a region of subsurface containing structural or stratigraphic features conducive to determining a presence, migration, or accumulation of hydrocarbons, the method comprising:
   accessing at least a portion of a blended seismic source survey containing blended seismic data, wherein the blended seismic source survey corresponds to at least two interfering seismic source excitation groups produced by at least two seismic source groups having different signatures or frequency characteristics;
   producing unblended seismic data by iteratively performing an interpolation and deblending operation on the blended seismic data, comprising:

estimating both first unblended signals and second unblended signals different from the first unblended signals, from the blended seismic data by applying a mask to the blended seismic data to filter from the first unblended signals cross-talk from any seismic source group of the at least two seismic source groups unrelated to the first unblended signals and to filter from the second unblended signals cross-talk from any seismic source group of the at least two seismic source groups unrelated to the second unblended signals; and predicting at least a portion of the weak-coherence signals caused by the at least two interfering seismic source excitation groups based on a portion of the blended seismic source survey in which the least two interfering seismic source excitation groups overlap above a threshold amount; and producing at least two source gather groups based on the unblended seismic data to be used to identify hydrocarbons within the region of the subsurface and determine a path along which to drill into Earth to explore for the hydrocarbons.

2. The method of claim 1, wherein the iterative interpolation and deblending operation comprises:

selecting a first coherency constraint for a first seismic source group of the at least two seismic source groups;

selecting a second coherency constraint for a second seismic source group of the at least two seismic sources, wherein the second coherency constraint is different from the first coherency constraint; and applying the first coherency constraint and the second coherency constraint during the deblending operation to the portion of the blended seismic source survey, wherein producing the at least two source gather groups is based at least in part on applying the first coherency constraint and the second coherency constraint.

3. The method of claim 2, wherein the threshold amount corresponds to an amount of overlap which permits at least the first coherency constraint and the iterative interpolation and deblending operation to be used to separate at least a portion of data for the first seismic source group from at least an additional portion of data for the second seismic source group.

4. The method of claim 1, wherein the iterative interpolation and deblending operation comprises:

indicating at least one weak-coherence portion of a trace associated with the blended seismic source survey;

removing from the trace the at least one weak-coherence portion of the trace; and predicting a value for the at least one weak-coherence portion of the trace based at least in part on at least one coherent portion of the trace.

5. The method of claim 4, wherein the at least one weak-coherence portion of the trace is indicated via null-defining symbol, character, or value stored within the mask.

6. The method of claim 4, wherein predicting the value for the at least one weak-coherence portion of the trace comprises referencing at least two data set portions logically disposed adjacent to the at least one weak-coherence portion.

7. The method of claim 1, wherein the iterative interpolation and deblending operation comprises applying interpolation operations to:

predict signals in a uniform grid; and reconstruct signals back to an original non-uniform grid based on the predicted signals in the uniform grid, when the signals are acquired in the non-uniform grid.

8. The method of claim 1, wherein the at least two source gathers respectively comprise seismic data representative of a different frequency range and at least some predicted data corresponding to the weak-coherence signals generated based at least in part on the iterative interpolation and deblending operation.

9. The method of claim 1, wherein the iterative interpolation and deblending operation comprises:

determining at least one weak-coherence portion of a trace associated with the blended seismic source survey;

generating a mask to logically indicate a location of the at least one weak-coherence portion of the trace within a data set corresponding to the trace;

removing the at least one weak-coherence portion of the trace from the data set corresponding to the trace; and combining at least one predicted value for the at least one weak-coherence portion of the trace based at least in part on at least one coherent portion of the trace.

10. The method of claim 9, wherein removing from the at least one weak-coherence portion of the trace from the data set comprises applying the mask to the data set to zero-out the at least one weak-coherence portion of the trace from the data set.

11. The method of claim 1, wherein the at least two seismic source groups comprise a combination of: vibrational sources, airgun sources, sparker sources, and low-frequency sources.

12. The method of claim 1, wherein producing the unblended seismic data by iteratively performing the interpolation and deblending operation on the blended seismic data comprises applying a combing operator to masked seismic data obtained by applying the mask to the blended seismic data.

13. The method of claim 12, wherein the combing operator comprises a transpose of a blending operator of the interpolation and deblending operation.

14. The method of claim 1, wherein the mask corresponds to overlapping seismic signals from interfering seismic sources of the at least two seismic source groups.

15. A tangible, non-transitory, machine-readable media, comprising instructions configured to cause a processor to:

access at least a portion of a blended seismic source survey, wherein the blended source seismic survey containing blended seismic data and that corresponds to at least two interfering seismic source excitation groups, wherein the seismic source excitations are produced by at least two seismic source groups comprising a first source group and a second source group;

produce unblended seismic data by iteratively performing an interpolation and deblending operation on the blended seismic data in which the processor is caused to:

estimate both first unblended signals and second unblended signals different from the first unblended signals, from the blended seismic data by applying a mask to the blended seismic data to filter from the first unblended signals cross-talk from any seismic source group of the at least two seismic source groups unrelated to the first unblended signals and to filter from the second unblended signals cross-talk from any seismic source group of the at least two seismic source groups unrelated to the second unblended signals; and predict at least a portion of weak-coherence signals caused by the at least two interfering seismic source excitation groups based on a portion of the blended seismic source survey in which the least two interfering seismic source excitation groups overlap above a threshold amount;

produce at least two separate source gather groups based at least in part on the unblended seismic data, wherein the at least two separate source gather groups are respectively associated with the data sets that are non-overlapping or overlapping within the same source excitation group; and transmit the at least two separate source gathers for use in generating a seismic image, wherein the seismic image represents hydrocarbons in a subsurface region of Earth or subsurface drilling hazards and is used to identify the hydrocarbons within the subsurface region of Earth and determine a path along which to drill into the Earth to explore for the identified hydrocarbons.

16. The tangible, non-transitory, machine-readable media of claim 15, wherein the at least two seismic sources each respectively transmit seismic source excitations comprising different signatures or frequency characteristics, and wherein the at least two seismic sources comprise a combination of one or more of: vibrational sources, airgun sources, sparker sources, or low-frequency sources, or any combination thereof.

17. The tangible, non-transitory, machine-readable media of claim 15, wherein the instructions for producing the unblended seismic data by iteratively performing the interpolation and deblending operation on the blended seismic data comprise instructions configured to cause the processor to:

determine at least one weak-coherence portion of a trace associated with the blended seismic source survey;

generate the mask to logically indicate a location of the at least one weak-coherence portion of the trace within a data set corresponding to the trace;

remove the at least one weak-coherence portion of the trace from the data set corresponding to the trace; and combine at least one predicted value for the at least one weak-coherence portion of the trace based at least in part on at least one coherent portion of the trace.

18. The tangible, non-transitory, machine-readable media of claim 17, wherein the instructions for removing the at least one weak-coherence portion of the trace from the data set comprise instructions configured to cause the processor to:

zero-out the at least one weak-coherence portion of the trace from the data set at least in part by applying the mask to the data set.

19. The tangible, non-transitory, machine-readable media of claim 15, wherein the instructions for producing the unblended seismic data by iteratively performing the interpolation and deblending operation on the blended seismic data comprise instructions configured to cause the processor to:

indicate at least one weak-coherence portion of a trace in a data set associated with the blended seismic source survey;

remove from the data set the at least one weak-coherence portion of the trace;

predicting a value for the at least one weak-coherence portion of the trace based at least in part on the iterative interpolation and deblending operation being performed on the remaining portions of the trace in the data set; and combining the remaining portions of the trace in the data set with the predicted value of the at least one weak-coherence portion in a separate source gather corresponding to the first source group.

20. The tangible, non-transitory, machine-readable media of claim 19, wherein the at least one weak-coherence portion of the trace corresponds to a time at which seismic source excitations of the first source group interfered with seismic source excitations of the second source group.

21. The tangible, non-transitory, machine-readable media of claim 19, wherein transmitting the at least two source gather groups comprising transmitting the separate source gather despite an initial presence of the at least one weak-coherence portion of the trace.

22. A device, comprising:

a memory storing instructions; and a processor coupled to the memory and configured to execute the instructions, which cause the processor to:

access at least a portion of a blended seismic source survey containing blended seismic data, wherein the blended source seismic survey corresponds to at least two interfering seismic source excitation groups, wherein the seismic source excitations are produced by at least two seismic source groups comprising a first source group and a second source group;

produce unblended seismic data by iteratively performing an interpolation and deblending operation on the blended seismic data in which the processor is caused to:

estimates both first unblended signals and second unblended signals, different from the first unblended signals, from the blended seismic data by applying a mask to the blended seismic data to filter from the first unblended signals cross-talk from any seismic source group of the at least two seismic source groups unrelated to the first unblended signals and to filter from the second unblended signals cross-talk from any seismic source group of the at least two seismic source groups unrelated to the second unblended signals; and predicts at least a portion of weak-coherence signals caused by the at least two interfering seismic source excitation groups based on a portion of the blended seismic source survey in which the least two interfering seismic source excitation groups overlap above a threshold amount;

produce at least two source gather groups based on the unblended seismic data, wherein the at least two source gather groups are respectively associated with the data sets that are non-overlapping or overlapping within the same source excitation group; and transmit the at least two source gathers for use in generating a seismic image, wherein the seismic image represents hydrocarbons in a subsurface region of Earth or subsurface drilling hazards and is used to identify the hydrocarbons within the subsurface region of Earth and determine a path along which to drill into the Earth to explore for the identified hydrocarbons.

23. The device of claim 22, wherein the processor is configured to produce the unblended seismic data based at least in part on iterative processes that configured to be repeated until an end condition is met.

24. The device of claim 22, wherein the processor is configured to produce the unblended seismic data at least in part by:

determining at least one weak-coherence portion of a trace associated with the blended seismic source survey;

generating a mask to logically indicate a location of the at least one weak-coherence portion of the trace within a data set corresponding to the trace;

removing the at least one weak-coherence portion of the trace from the data set corresponding to the trace by applying the mask to the data set; and combining at least one predicted value for the at least one weak-coherence portion of the trace based at least in part on at least one coherent portion of the trace.

* * * * *